(12) United States Patent
Wang et al.

(10) Patent No.: US 10,782,593 B2
(45) Date of Patent: Sep. 22, 2020

(54) LENS MODULE AND CAPTURING MODULE INTERGRATING FOCUSING MECHANISM AND ASSEMBLY METHOD THEREFOR

(71) Applicant: NINGBO SUNNY OPOTECH CO., LTD., Zhejiang (CN)

(72) Inventors: Mingzhu Wang, Zhejiang (CN); Heng Jiang, Zhejiang (CN); Feifan Chen, Zhejiang (CN); Chunmei Liu, Zhejiang (CN); Nan Guo, Zhejiang (CN); Hong Li, Zhejiang (CN); Bojie Zhao, Zhejiang (CN); Liang Ding, Zhejiang (CN)

(73) Assignee: Ningbo Sunny Opotech Co., Ltd. (CN)

( * ) Notice: Subject to any disclaimer, the term of this patent is extended or adjusted under 35 U.S.C. 154(b) by 103 days.

(21) Appl. No.: 16/062,028

(22) PCT Filed: Dec. 16, 2016

(86) PCT No.: PCT/CN2016/110370
§ 371 (c)(1),
(2) Date: Jun. 13, 2018

(87) PCT Pub. No.: WO2017/101853
PCT Pub. Date: Jun. 22, 2017

(65) Prior Publication Data
US 2018/0364545 A1    Dec. 20, 2018

(30) Foreign Application Priority Data

Dec. 16, 2015   (CN) .......................... 2015 1 0939159
Dec. 16, 2015   (CN) .......................... 2015 1 0940194
Dec. 16, 2015   (CN) .......................... 2015 1 0944182

(51) Int. Cl.
*G02B 15/14*     (2006.01)
*G02B 7/02*      (2006.01)
(Continued)

(52) U.S. Cl.
CPC ............. *G03B 13/34* (2013.01); *G02B 7/023* (2013.01); *G02B 7/025* (2013.01); *G02B 7/04* (2013.01); *G02B 27/62* (2013.01); *G03B 11/00* (2013.01)

(58) Field of Classification Search
CPC .......... G02B 7/025; G02B 7/023; G02B 7/02; G02B 7/04; G03B 11/00; G03B 13/34
(Continued)

(56) References Cited

U.S. PATENT DOCUMENTS 8,164,677 B2 * 4/2012 Guo .......................... G02B 7/04
                                                        348/340
2001/0009443 A1    7/2001 Suemoto et al.
(Continued)

FOREIGN PATENT DOCUMENTS

CN          2757155 Y      2/2006
CN        202472093 U     10/2012
(Continued)

*Primary Examiner* — Mahidere S Sahle
(74) *Attorney, Agent, or Firm* — Barnes & Thornburg LLP

(57) ABSTRACT

A lens module and a capturing module integrating a focusing mechanism and an assembly method therefor. A lens module (1010) comprises at least one optical lens (1011), a focusing mechanism (1012), and a supporting structure component (1013). Each optical lens (1011) is mounted in an accommodating cavity of the supporting structure component (1013) in a height direction of the supporting structure component (1013). The supporting structure component (1013) is connected inside of the focusing mechanism (1012) as a carrier of the focusing mechanism (1012). The supporting structure component (1013) moves as the focus-
(Continued)

ing mechanism (1012) is powered, and is thereby suitable for focusing. By replacing a carrier and a lens cone of a conventional focusing mechanism with the supporting structure component (1013), an overall assembly process is simplified, the yield and quality of a module are improved, and the manufacturing costs are reduced.

25 Claims, 18 Drawing Sheets

(51) Int. Cl.
    *G03B 13/34*     (2006.01)
    *G02B 7/04*     (2006.01)
    *G02B 27/62*     (2006.01)
    *G03B 11/00*     (2006.01)

(58) Field of Classification Search
    USPC ................ 359/694–706, 722, 723, 811–830
    See application file for complete search history.

(56) References Cited

U.S. PATENT DOCUMENTS

| | | |
|---|---|---|
| 2007/0047938 A1 | 3/2007 | Suzuki et al. |
| 2009/0185284 A1* | 7/2009 | Tsai .................. G02B 7/04 |
| | | 359/694 |
| 2010/0033850 A1 | 2/2010 | Chang |
| 2011/0199530 A1* | 8/2011 | Kosaka .................. G02B 7/02 |
| | | 348/340 |
| 2013/0314810 A1 | 11/2013 | Sekimoto et al. |
| 2015/0062422 A1 | 3/2015 | Stern |
| 2015/0077840 A1* | 3/2015 | Kim .................. H04N 5/2257 |
| | | 359/355 |
| 2015/0293330 A1* | 10/2015 | Gutierrez .......... G02B 13/0015 |
| | | 359/811 |
| 2015/0301303 A1* | 10/2015 | Kim .................. G02B 7/021 |
| | | 348/373 |
| 2015/0370034 A1* | 12/2015 | Kasuga .................. G02B 7/022 |
| | | 359/819 |
| 2016/0182829 A1 | 6/2016 | Shin |

FOREIGN PATENT DOCUMENTS

| | | |
|---|---|---|
| CN | 203133370 U | 8/2013 |
| CN | 204613480 U | 9/2015 |
| EP | 3385766 A1 | 10/2018 |
| JP | S60239704 A | 1/1985 |
| JP | 2002196208 A | 7/2002 |
| JP | 2005088659 A | 4/2005 |
| JP | 2007225768 A | 9/2007 |
| JP | 2015060104 A | 3/2015 |
| JP | 2015072388 A | 4/2015 |
| KR | 20130035522 A | 4/2013 |
| KR | 10147221 B1 | 12/2014 |
| KR | 101474221 B1 | 12/2014 |

* cited by examiner

LENS MODULE AND CAPTURING MODULE INTERGRATING FOCUSING MECHANISM AND ASSEMBLY METHOD THEREFOR

CROSS-REFERENCE TO RELATED APPLICATION

This application is a U.S. nationalization under 35 U.S.C. § 371 of International Application No. PCT/CN2016/110370, filed Dec. 16, 2016, which claims the priorities to Chinese Patent Application No. 201510940194.8, filed on Dec. 16, 2015, Chinese Patent Application No. 201510939159.4, filed on Dec. 16, 2015, and Chinese Patent Application No. 201510944182.2, filed Dec. 16, 2015. All of the aforementioned applications are hereby incorporated by reference in their entireties.

TECHNICAL FIELD

The present disclosure relates to the field of camera module, and specially relates to a lens assembly and a camera module integrating a focusing mechanism and an assembly method thereof.

BACKGROUND

With the increasingly fierce competition in the camera module market, the decrease in manufacturing cost, increase in production efficiency, and improvement in image quality of the camera module have become goals pursued by camera module manufacturers.

Generally, an adjustable focus camera module is composed of important components such as a lens assembly, a focusing mechanism, and a photosensitive chip. The manufacture of the adjustable focus camera module always is assembling these components. The manufacture of the lens assembly and the focusing mechanism itself is an assembly of the parts and components. After the assembly, the finished lens assembly and the focusing mechanism are assembled, and then assembled with the photosensitive device to complete the assembly of the camera module. This assembly method has the following problems: first, the assembly process is relatively cumbersome, resulting in a lower production efficiency of the camera module; secondly, an assembly tolerance between the lens assembly and the focusing mechanism in the assembly process, and assembly tolerances of the lens assembly and the focusing mechanism themselves result a long tolerance chain, and affect the quality of the module; thirdly, the module assembled in this way has a relatively large size in length and width, which is not conducive to the development trend of a light and thin camera module; fourth, dust may easily enter the lens assembly and the focusing mechanism in the assembly process, resulting in defects such as stains. The detects are caused because the connection between the lens assembly and the focusing mechanism is not so tight and there may be small gaps between the two, such that the dust enters the connection portion between the lens assembly and the focusing mechanism and is difficult to be removed. If the dust inside the module is not removed for a long time, the lens assembly, the focusing mechanism and the entire camera module may be contaminated, affecting the image quality and the service life of the camera module, which may affect the quality of the entire product equipped with the camera module.

The lens assembly includes multiple lenses overlapping each other. The position of the center axis of each lens affects the center axis of the lens assembly. The ideal situation is that the center axes of the lenses are coincident. However, due to limitations of the packaging process and the quality of supplied materials, the center axis of each lens may have a certain deviation. In addition, since each lens needs to be packaged in the lens barrel by means of glue or welding, the packaging process may affect the position and gradient of the lens, resulting in a large deviation of the center axes of the lenses. When the lens assembly and the photosensitive chip are packaged together to form the camera module, since it is difficult to ensure that the center axis of the lens assembly is consistent with the center axis of the photosensitive chip, eccentricity and tilting may occur, which inevitably results in a great impact on the image quality of the camera module, and the product yield of the camera module is difficult to be controlled and ensured. Therefore, how to ensure the image quality of the camera module when being manufactured becomes an urgent technical difficulty to be solved.

In addition, for a split lens assembly module, in the process of assembling each of the lens barrels to form the camera module, the assemblies of the lens barrels also has assembly tolerances, and the lens assemblies of a conventional split lens assembly are fixed together to form a split lens assembly module. Moreover, a produced split lens assembly module can no longer be calibrated. These tolerances may cause an unstable optical quality of the lens assembly, thereby affecting the production efficiency and image quality of the entire camera module. Therefore, in the manufacturing process of the lens assembly module of the camera module, how to ensure the image quality of the produced split lens assembly also becomes an urgent problem to be solved.

Therefore, in the manufacturing process of the camera module, how to effectively solve the above problems is the key to improving the manufacturing yield and image quality of the camera module.

SUMMARY

An objective of the present disclosure is to provide a lens assembly and a camera module integrating a focusing mechanism and an assembly method thereof, to solve the problems in the existing technology that the lens assembly and the module assembly have too long tolerance chain, low production efficiency, high manufacturing cost, large module size, and poor module imaging quality.

An objective of the present disclosure is to provide a lens assembly and a camera module integrating a focusing mechanism and an assembly method thereof. The holder of the focusing mechanism and the lens barrel of the lens assembly are used as one body, reducing the assembly process between the lens barrel and the holder of the focusing mechanism, and thus simplifying the overall assembly process of the camera module, which is helpful to improve the production efficiency and image quality.

An objective of the present disclosure is to provide a lens assembly and a camera module integrating a focusing mechanism and an assembly method thereof. The optical lens is directly assembled in the holder of the focusing mechanism, which changes the conventional assembly method of assembling the optical lens and the lens barrel before assembling the lens barrel and the holder of the focusing mechanism, shortening the assembly tolerance chain, which is helpful to improve the module manufacturing yield, and reduce the assembly cost of the module.

An objective of the present disclosure is to provide a lens assembly and a camera module integrating a focusing mechanism and an assembly method thereof. The bearing structure replaces the conventional holder of the focusing mechanism and the lens barrel of the lens assembly, making the sizes of the lens assembly and the module smaller, which is helpful to the development trend of the light and thin camera module.

An objective of the present disclosure is to provide a lens assembly and a camera module integrating a focusing mechanism and an assembly method thereof. The holder of the focusing mechanism is designed with a structure and a shape as the lens barrel to directly hold the optical lens, and drive the lens to move, having a good focusing effect.

An objective of the present disclosure is to provide a lens assembly and a camera module integrating a focusing mechanism and an assembly method thereof. A photosensitive device of the camera module is suitable for being manufactured by a COB process or a flip-chip process, and the range of selection is wide, so that the manufacture of the camera module is more convenient. With photosensitive device adopting the flip-chip process, the camera module has a smaller size and a more compact structure.

An objective of the present disclosure is to provide a lens assembly and a camera module integrating a focusing mechanism and an assembly method thereof, omitting the assembly between the lens barrel and the holder of the focusing mechanism, which may avoid dust entering a connection portion between the lens barrel and the holder of the focusing mechanism in the conventional assembly method, which is helpful to ensure the image quality of the camera module.

An objective of the present disclosure is to provide a lens assembly and a camera module integrating a focusing mechanism and an assembly method thereof. The lens assembly integrating the focusing mechanism is fixed by a corresponding jig, which is conducive to the mounting of the optical lens 2011.

An objective of the present disclosure is to provide a lens assembly and a camera module integrating a focusing mechanism and an assembly method thereof. Assembling using a jig is a method whish is simple, feasible, easy to operate, time-saving, and is suitable for popularization and application.

An objective of the present disclosure is to provide a lens assembly and a camera module integrating a focusing mechanism and an assembly method thereof. The jig used for assisting the assembly matches the lens assembly module, to fix the lens assembly module, which facilitates the mounting of the optical lens and prevents an offset, tilting, etc., to ensure the assembly precision of the lens assembly module.

An objective of the present disclosure is to provide a lens assembly and a camera module integrating a focusing mechanism and an assembly method thereof. At least one optical lens is pre-assembled as an adjustable lens to form an adjustable optical lens assembly to facilitate the adjustment of the pre-assembled optical lens in at least one direction in a subsequent process, which is helpful to ensure the image quality of the camera module.

An objective of the present disclosure is to provide a lens assembly and a camera module integrating a focusing mechanism and an assembly method thereof. In the process of forming the camera module by packaging an adjustable optical lens assembly and a photosensitive chip, by adjusting the adjustable lens, the imaging of the camera module meets an expected resolution requirement. Thus, the image quality of the manufactured camera module may be ensured in the manufacturing process of the camera module, ensuring the reliability of the camera module and improving the production efficiency.

An objective of the present disclosure is to provide a lens assembly and a camera module integrating a focusing mechanism and an assembly method thereof. The pre-assembled optical lens is mounted in a bearing structure that replaces the conventional holder of the focusing mechanism and lens barrel of the lens assembly, making the sizes of the lens assembly and the module smaller, which is helpful to the development trend of the thin and light camera module.

An objective of the present disclosure is to provide a lens assembly and a camera module integrating a focusing mechanism and an assembly method thereof. The bearing structure is provided with at least one adjustment channel. When the optical lens 2011 is packaged in the internal space of the optical structure to form an adjustable optical lens assembly, the adjustable lens corresponds to the adjustment channel in the internal space of the bearing structure. The position of the adjustable lens in the internal space of the bearing structure can be adjusted in the external environment of the bearing structure through the adjustment channel, which facilitates the operation.

An objective of the present disclosure is to provide a lens assembly and a camera module integrating a focusing mechanism and an assembly method thereof. In the process of packaging the camera module, by adjusting the adjustable lens, the center axis of the adjustable optical lens assembly and the center axis of the photosensitive chip are adjusted to be consistent or be within an allowable range of deviation, so that the product yield of the camera module can be ensured, and the image quality of the camera module is improved.

An objective of the present disclosure is to provide a lens assembly and a camera module integrating a focusing mechanism and an assembly method thereof. Since the holder of the focusing mechanism and the lens barrel of the lens assembly are used as one body, the assembly process between the lens barrel and the holder of the focusing mechanism is reduced, thereby simplifying the overall assembly process of the camera module and shortening the assembly tolerance chain, which is conducive to improving the production efficiency, the product yield and the image quality.

An objective of the present disclosure is to provide a lens assembly and a camera module integrating a focusing mechanism and an assembly method thereof. The holder of the focusing mechanism is designed with a structure and a shape of the lens barrel to directly hold the optical lens, and drive the lens to move, having the good focusing effect.

An objective of the present disclosure is to provide a lens assembly and a camera module integrating a focusing mechanism and an assembly method thereof, omitting the assembly between the lens barrel and the holder of the focusing mechanism, which may avoid the dust entering the connection portion between the two in the conventional assembly method, which is helpful to ensure the image quality of the camera module.

An objective of the present disclosure is to provide a lens assembly and a camera module integrating a focusing mechanism and an assembly method thereof. The adjustable optical lens assembly prepared by this method is more compact in structure, suitable for various application scenarios, and widens its application range.

An objective of the present disclosure is to provide a lens assembly and a camera module integrating a focusing mechanism and an assembly method thereof. Assembling using a jig is a method whish is simple, feasible, easy to operate, time-saving, and is suitable for popularization and application.

An objective of the present disclosure is to provide a lens assembly and a camera module integrating a focusing mechanism and an assembly method thereof. The jig used for assisting the assembly matches the adjustable optical lens assembly, to fix the adjustable optical lens assembly, which facilitates the mounting of the optical lens and prevents an offset, tilting, etc., to ensure the assembly precision of the adjustable optical lens assembly.

An objective of the present disclosure is to provide a lens assembly and a camera module integrating a focusing mechanism and an assembly method thereof, which eliminate defects in the assembly steps of the lens assembly module of the conventional camera module. The assembly and calibration of the lens assembly are integrated into the overall assembly process of the camera module, which improves the image quality of the camera module.

An objective of the present disclosure is to provide a lens assembly and a camera module integrating a focusing mechanism and an assembly method thereof. The camera module is adjusted and calibrated before packaging to reduce the processing steps of the split lens assembly and the entire camera module, which improves the production efficiency and reduces the manufacturing cost.

An objective of the present disclosure is to provide a lens assembly and a camera module integrating a focusing mechanism and an assembly method thereof, which include at least one to-be-adjusted lens assembly. Each to-be-adjusted lens assembly includes at least one optical lens 2011 and at least one lens barrel member. The assembly position of each to-be-adjusted lens assembly is adjustable and the assembly position is calibrated, thereby improving the optical quality of the overall lens assembly including the to-be-adjusted lens.

An objective of the present disclosure is to provide a lens assembly and a camera module integrating a focusing mechanism and an assembly method thereof. By calibrating the assembly position of the lens barrel member, tolerances of the preceding steps are compensated, assembly tolerance requirements for other parts of the camera module are reduced, the production efficiency is improved, and the assembly cost is reduced.

An objective of the present disclosure is to provide a lens assembly and a camera module integrating a focusing mechanism and an assembly method thereof. The to-be-adjusted lens assemblies may be adjusted in multiple directions, and the adjustment is more convenient, which is helpful to ensure the assembly precision and the image quality.

An objective of the present disclosure is to provide a lens assembly and a camera module integrating a focusing mechanism and an assembly method thereof. By mounting the optical lens in a bearing structure to form a fixing lens assembly, the bearing structure replaces the conventional holder of the focusing mechanism and the lens barrel of the lens assembly, making the sizes of the lens assembly and the module smaller, which is helpful to the development trend of thin and light the camera module.

An objective of the present disclosure is to provide a lens assembly and a camera module integrating a focusing mechanism and an assembly method thereof. The holder of the focusing mechanism is designed with a structure and a shape of the lens barrel to directly hold the optical lens, and drive the lens to move, having the good focusing effect.

In order to achieve at least one of the above objectives of the present disclosure, one aspect of the present disclosure provides a lens assembly module integrating a focusing mechanism, including:
optical lenses;
a focusing mechanism; and
a bearing structure, where four of the optical lenses are mounted inside an accommodating cavity of the bearing structure along a height direction of the bearing structure, an inner wall of the bearing structure extends toward the accommodating cavity to form at least one fixing portion, the fixing portion is suitable for placing the optical lenses, and the bearing structure is connected to an inner portion of the focusing mechanism and used as a holder of the focusing mechanism, where the bearing structure moves as the focusing mechanism is powered on, drives the optical lenses to move, which is suitable for focusing.

Another aspect of the present disclosure provides a camera module, including:
a photosensitive device, the photosensitive device including an optical filter, a lens holder and a circuit board, where the optical filter and the photosensitive chip are both mounted inside the lens holder and connected to an inner portion of the lens holder, the optical filter is disposed above the photosensitive chip, the circuit board is mounted on a bottom of the lens holder; and
a lens assembly module, where the lens assembly module is mounted on a photosensitive path of the photosensitive chip, and the lens assembly module includes:
optical lenses;
a focusing mechanism; and
a bearing structure, where four of the optical lenses are mounted inside an accommodating cavity of the bearing structure along a height direction of the bearing structure, an inner wall of the bearing structure extends toward the accommodating cavity to form at least one fixing portion, the fixing portion is suitable for placing the optical lenses, and the bearing structure is connected to an inner portion of the focusing mechanism and used as a holder of the focusing mechanism, where the bearing structure moves as the focusing mechanism is powered on, and drives the optical lenses to move, and which is suitable for focusing.

Another aspect of the present disclosure provides an adjustable optical lens assembly integrating a focusing mechanism, including:
four optical lenses, which are a first optical lens, a second optical lens, a third optical lens and a fourth optical lens;
a focusing mechanism; and
a bearing structure, where the optical lenses are mounted in an internal space of the bearing structure along a height direction of the bearing structure, the first optical lens is located at a top of the adjustable optical lens assembly, the first optical lens is pre-assembled as an adjustable lens into the bearing structure, an assembly position of the adjustable lens in the bearing structure is adjustable, and the bearing structure is further connected to an inner portion of the focusing mechanism and used as a holder of the focusing mechanism, and moves as the focusing mechanism is powered on and which is suitable for focusing,
where the bearing structure has an adjustment channel, and the adjustment channel connects the internal space of the bearing structure with an external environment, and corresponds to a position of the first optical lens, to adjust an assembly position of the first optical lens.

According to some embodiments, in the adjustable optical lens assembly integrating a focusing mechanism, a top of the bearing structure has a fixing channel, the fixing channel corresponds to the first optical lens and, and is adapted to allow glue injected through the fixing channel to fix the first optical lens after the first optical lens is adjusted.

Another aspect of the present disclosure provides a camera module, including:

a photosensitive device, the photosensitive device including a photosensitive chip;

an adjustable optical lens assembly, where the adjustable optical lens assembly is located on a photosensitive path of the photosensitive chip, and the adjustable optical lens assembly includes:

four optical lenses, which are a first optical lens, a second optical lens, a third optical lens and a fourth optical lens;

a focusing mechanism; and a bearing structure, where the optical lenses are mounted in an internal space of the bearing structure along a height direction of the bearing structure, the first optical lens is located at a top of the adjustable optical lens assembly, the first optical lens is pre-assembled as an adjustable lens into the bearing structure, an assembly position of the adjustable lens in the bearing structure is adjustable, and the bearing structure is further connected to an inner portion of the focusing mechanism and used as a holder of the focusing mechanism, and moves as the focusing mechanism is powered on, which is suitable for focusing, where the bearing structure has an adjustment channel, and the adjustment channel connects the internal space of the bearing structure with an external environment, and corresponds to a position of the first optical lens, to adjust an assembly position of the first optical lens.

Another aspect of the present disclosure provides a split lens assembly module integrating a focusing mechanism, including:

a focusing mechanism; and a lens assembly, where the lens assembly includes four optical lenses, a lens barrel member and a bearing structure; the lens barrel member holds one optical lens to form a to-be-adjusted lens assembly, the bearing structure holds three optical lenses to form a fixing lens assembly, the to-be-adjusted lens assembly is pre-assembled on the fixing lens assembly by glue, the to-be-adjusted lens assembly is suitable for being adjusted relative to an assembly of the fixing lens assembly, and the bearing structure is connected to an inner portion of the focusing mechanism and used as a holder of the focusing mechanism, and moves as the focusing mechanism is powered on, which is suitable for focusing.

Another aspect of the present disclosure provides a camera module, including:

a photosensitive device, the photosensitive device including a photosensitive chip; and a split lens assembly module, where the split lens assembly module includes:

a focusing mechanism; and a lens assembly, where the lens assembly includes four optical lenses, a lens barrel member and a bearing structure; the lens barrel member holds one optical lens to form a to-be-adjusted lens assembly, the bearing structure holds three optical lenses to form a fixing lens assembly, the to-be-adjusted lens assembly is pre-assembled on the fixing lens assembly by glue, the to-be-adjusted lens assembly is suitable for being adjusted relative to an assembly of the fixing lens assembly, the bearing structure is connected to an inner portion of the focusing mechanism and used as a holder of the focusing mechanism, and moves as the focusing mechanism is powered on, which is suitable for focusing.

The present disclosure provides a lens assembly module, including:

at least one optical lens;

a focusing mechanism; and a bearing structure, where the at least one optical lens is mounted inside an accommodating cavity of the bearing structure along a height direction of the bearing structure, the bearing structure is connected to an inner portion of the focusing mechanism and used as a holder of the focusing mechanism, and the bearing structure moves as the focusing mechanism is powered on, and drives the optical lenses to move, which is suitable for focusing.

According to an embodiment of the present disclosure, an inner wall of the bearing structure extends toward accommodating cavity to form at least one fixing portion, and the fixing portion is suitable for placing the at least one optical lens.

According to an embodiment of the present disclosure, the focusing mechanism is suitable for being selected from a voice coil motor, a piezoelectric ceramic motor or a liquid crystal motor.

According to an embodiment of the present disclosure, a top end surface of the bearing structure is lower than a top end surface of the focusing mechanism.

According to an embodiment of the present disclosure, a top end surface of the bearing structure is higher than a top end surface of the focusing mechanism.

According to another aspect of the present disclosure, the present disclosure further provides a camera module, including:

a photosensitive device, the photosensitive device including a photosensitive chip; and a lens assembly module, where the lens assembly module is mounted on a photosensitive path of the photosensitive chip, the lens assembly module includes at least one optical lens, a focusing mechanism and a bearing structure, the at least one optical lens is mounted inside an accommodating cavity of the bearing structure along a height direction of the bearing structure, the bearing structure is connected to an inner portion of the focusing mechanism and used as a holder of the focusing mechanism, the bearing structure moves as the focusing mechanism is powered on, and drives the optical lenses to move, which is suitable for focusing.

According to an embodiment of the present disclosure, an inner wall of the bearing structure extends toward the accommodating cavity to form at least one fixing portion, and the fixing portion is suitable for placing the optical lenses.

According to an embodiment of the present disclosure, the focusing mechanism is suitable for being selected from a voice coil motor, a piezoelectric ceramic motor or a liquid crystal motor.

According to an embodiment of the present disclosure, the photosensitive device further includes an optical filter, a lens holder, and a circuit board, the optical filter is connected to an inner wall of the lens holder and located above the photosensitive chip, the photosensitive chip is mounted on the circuit board, and the circuit board is mounted on a bottom of the lens holder, so that the photosensitive chip is located inside the lens holder and separates from the inner wall of the lens holder.

According to an embodiment of the present disclosure, the photosensitive device further includes an optical filter, a lens holder, and a circuit board, the optical filter and the photosensitive chip are both mounted inside the lens holder and connected to an inner wall of the lens holder, the optical filter is disposed above the photosensitive chip, and the circuit board is mounted on a bottom of the lens holder.

Here, the focusing mechanism and the bearing structure are assembled on a top of the lens holder.

According to another aspect of the present disclosure, the present disclosure further provides a method for assembling a lens assembly module, including the following steps (A) to (D):

(A) inversely disposing a focusing mechanism and a bearing structure on a jig;

(B) adjusting the jig, and fixing the focusing mechanism and the bearing structure on the jig;

(C) placing sequentially at least one optical lens in the bearing structure and fixing the at least one optical lens; and (D) completing an assembly of the lens assembly module.

According to an embodiment of the present disclosure, in the step (A), the jig has a first bearing portion matching a shape and a size of the bearing structure and being adapted to hold the bearing structure, and a second bearing portion matching a shape and a size of the focusing mechanism and being adapted to hold the focusing mechanism.

According to an embodiment of the present disclosure, in the step (B), the jig has at least two air channels each penetrating through a top and a bottom of the jig, the air channels are respectively disposed in the first bearing portion and the second bearing portion, and are adapted to allow the bearing structure and the focusing mechanism to be fixed through the air channels using a suction nozzle or a vacuum device.

According to an embodiment of the present disclosure, in the step (C), the at least one optical lens is assembled sequentially into the bearing structure one by one, or after a part of the at least one optical lens is fitted into one body, the fitted optical lens and an un-fitted optical lens are sequentially assembled into the bearing structure.

According to an embodiment of the present disclosure, in the step (C), the at least one optical lens is fixed using a thermosetting adhesive.

According to an embodiment of the present disclosure, in the step (A), the bearing structure is mounted inside the focusing mechanism and used as a holder of the focusing mechanism, and moves as the focusing mechanism is powered on.

According to an embodiment of the present disclosure, in the step (A), the focusing mechanism is connected with the bearing structure in advance as a whole or the bearing structure is pre-assembled inside the focusing mechanism, so that the focusing mechanism is connected to the bearing structure is further performed in the step (D).

According to an embodiment of the present disclosure, in the method, an inner wall of the bearing structure extends toward an accommodating cavity of the bearing structure to form a fixing portion whose number is equal to a number of the at least one optical lens to fix the at least one optical lens.

According to an embodiment of the present disclosure, in the method, a top end surface of the bearing structure is higher than a top end surface of the focusing mechanism, a top end surface of the first bearing portion of the jig is higher than a top end surface of the second bearing portion, a groove is formed between the first bearing portion and the second bearing portion, which is adapted to accommodate a portion of the bearing structure higher than the focusing mechanism, and a depth of the groove is equal to a height difference between the focusing mechanism and the bearing structure.

According to an embodiment of the present disclosure, in the method, a top end surface of the bearing structure is lower than a top end surface of the focusing mechanism, a top end surface of the first bearing portion of the jig is lower than a top end surface of the second bearing portion, a boss is formed between the first bearing portion and the second bearing portion, and a height of the boss is equal to a height difference between the focusing mechanism and the bearing structure.

The present disclosure provides an adjustable optical lens assembly, including:

at least one optical lens;

a focusing mechanism; and a bearing structure, where the at least one optical lens is mounted in an internal space of the bearing structure along a height direction of the bearing structure, and comprises at least one optical lens serving as an adjustable lens, an assembly position of the adjustable lens in the bearing structure is adjustable, and the bearing structure is further connected to an inner portion of the focusing mechanism and used as a holder of the focusing mechanism, moves as the focusing mechanism is powered on, which is suitable for focusing.

According to an embodiment of the present disclosure, the bearing structure has at least one adjustment channel, the adjustment channel connects the internal space of the bearing structure to an external environment, and corresponds to the adjustable lens, to adjust the assembly position of the adjustable lens.

According to an embodiment of the present disclosure, an optical lens disposed on a top of the adjustable optical lens assembly is used as the adjustable lens, a top of the bearing structure has at least one fixing channel, the fixing channel corresponds to the adjustable lens and is adapted to allow glue injected through the fixing channel after the adjustable lens is adjusted, to fix the adjustable lens.

According to an embodiment of the present disclosure, an inner wall of the bearing structure extends toward a cavity of the bearing structure to form at least one fixing portion, and the fixing portion is suitable for placing the optical lenses.

According to an embodiment of the present disclosure, a top end surface of the bearing structure is higher than a top end surface of the focusing mechanism, and the adjustment channel is disposed at a portion of the bearing structure higher than the focusing mechanism.

According to an embodiment of the present disclosure, the adjustable lens is pre-assembled in the bearing structure, and an assembly position of the adjustable lens is suitable for being adjusted in at least one direction.

According to an embodiment of the present disclosure, the adjustable lens is pre-assembled in the bearing structure by glue, the glue used in a pre-assembly is a mixed adhesive of a thermosetting adhesive and a UV adhesive, the glue is semi-cured by ultraviolet exposure to realize the pre-assembly, and the glue is completely cured by a baking treatment to fix the entire adjustable optical lens assembly.

According to an embodiment of the present disclosure, the focusing mechanism is suitable for being selected from a voice coil motor, a piezoelectric ceramic motor or a liquid crystal motor.

According to another aspect of the present disclosure, the present disclosure further provides a camera module, including:

a photosensitive device, the photosensitive device including a photosensitive chip;

an adjustable optical lens assembly, where the adjustable optical lens assembly is disposed on a photosensitive path of the photosensitive chip, the adjustable optical lens assembly includes at least one optical lens, a focusing mechanism and a bearing structure, the at least one optical lens is mounted in an internal space of the bearing structure along a height direction of the bearing structure, and comprises at least one optical lens serving as an adjustable lens, an assembly position of the adjustable lens in the bearing structure is adjustable, and the bearing structure is further connected to an inner portion of the focusing mechanism and used as a holder of the focusing mechanism, and moves as the focusing mechanism is powered on, which is suitable for focusing.

According to an embodiment of the present disclosure, the bearing structure has at least one adjustment channel, the adjustment channel connects the internal space of the bearing structure with an external environment, and corresponds to the adjustable lens, to adjust the assembly position of the adjustable lens.

According to an embodiment of the present disclosure, a top of the bearing structure has at least one fixing channel, the fixing channel corresponds to the adjustable lens and is adapted to allow glue injected through the fixing channel after the adjustable lens is adjusted, to further fix the adjustable lens.

According to an embodiment of the present disclosure, an inner wall of the bearing structure extends toward a cavity of the bearing structure to form at least one fixing portion being suitable for placing the optical lenses.

According to an embodiment of the present disclosure, a top end surface of the bearing structure is higher than a top end surface of the focusing mechanism, and the adjustment channel is disposed at a portion of the bearing structure higher than the focusing mechanism.

According to an embodiment of the present disclosure, the adjustable lens is pre-assembled in the bearing structure, and an assembly position of the adjustable lens is suitable for being adjusted in at least one direction.

According to an embodiment of the present disclosure, the adjustable lens is pre-assembled in the bearing structure by glue, the glue used in a pre-assembly is a mixed adhesive of a thermosetting adhesive and a UV adhesive, the glue is semi-cured by ultraviolet exposure to realize the pre-assembly, and the glue is completely cured by a baking treatment to fix the entire adjustable optical lens assembly.

According to an embodiment of the present disclosure, the photosensitive device further includes an optical filter, a lens holder, and a circuit board, the optical filter is connected to an inner wall of the lens holder and located above the photosensitive chip, the photosensitive chip is mounted on the circuit board, and the circuit board is mounted on a bottom of the lens holder, so that the photosensitive chip is located inside the lens holder and separates from the inner wall of the lens holder.

According to an embodiment of the present disclosure, the photosensitive device further includes an optical filter, a lens holder, and a circuit board, the optical filter and the photosensitive chip are both mounted inside the lens holder and connected to an inner wall of the lens holder, the optical filter is disposed above the photosensitive chip, and the circuit board is mounted on a bottom of the lens holder.

According to an embodiment of the present disclosure, the focusing mechanism and the bearing structure are assembled on a top of the lens holder.

According to another aspect of the present disclosure, the present disclosure further provides a method for assembling an adjustable optical lens assembly, including the following steps (A), (B), (C), (D) and (E):

(A) disposing inversely a focusing mechanism and a bearing structure on a jig;

(B) adjusting the jig, and fixing the focusing mechanism and the bearing structure on the jig;

(C) placing sequentially at least one optical lens in an internal space of the bearing structure, the at least one optical lens comprising at least one optical lens serving as an adjustable lens;

(D) fixing an optical lens other than the adjustable lens; and (E) completing an assembly of the adjustable optical lens assembly.

According to an embodiment of the present disclosure, in the step (A), a first bearing portion and a second bearing portion of the jig are respectively used to hold the bearing structure and the focusing mechanism, he first bearing portion matching a shape and a size of the bearing structure, and the second bearing portion matching a shape and size of the focusing mechanism.

According to an embodiment of the present disclosure, in the step (B), the bearing structure and the focusing mechanism are fixed by at least two air channels of the jig each penetrating through a top and a bottom of the jig, and the air channels are respectively disposed in the first bearing portion and the second bearing portion and further adapted to allow a suction nozzle or a vacuum device to fix the bearing structure and the focusing mechanism through the air channels.

According to an embodiment of the present disclosure, in the step (C), optical lenses other than the adjustable lens are assembled sequentially into an internal space of the bearing structure one by one, or a part of the optical lenses other than the adjustable lens are fitted into one body, and the fitted optical lens and an un-fitted optical lens are sequentially assembled into the bearing structure.

According to an embodiment of the present disclosure, in the step (D), the adjustable lens is pre-assembled in the bearing structure by glue without fixing, optical lenses other than the adjustable lens are directly fixed into the bearing structure, the glue used in the pre-assembly is a mixed adhesive of a thermosetting adhesive and a UV adhesive, and the glue is semi-cured by ultraviolet exposure to realize the pre-assembly.

According to an embodiment of the present disclosure, in the method, the bearing structure is provided with at least one adjustment channel, the adjustment channel connects the internal space of the bearing structure with an external environment, and corresponds to the adjustable lens, to adjust an assembly position of the adjustable lens.

According to an embodiment of the present disclosure, a top end surface of the bearing structure is higher than a top end surface of the focusing mechanism, and the adjustment channel is disposed at a portion of the bearing structure higher than the focusing mechanism.

According to an embodiment of the present disclosure, in the step (A), the bearing structure is mounted inside the focusing mechanism and used as a holder of the focusing mechanism, and moves as the focusing mechanism is powered on.

According to an embodiment of the present disclosure, in the step (A), the focusing mechanism is connected with the bearing structure in advance as a whole or the bearing structure is pre-assembled inside the focusing mechanism, so that the focusing mechanism is connected to the bearing structure in the step (E).

According to an embodiment of the present disclosure, in the method, a top end surface of the bearing structure is higher than a top end surface of the focusing mechanism, the jig includes a groove adapted to accommodate a portion of the bearing structure higher than the focusing mechanism, and a depth of the groove is equal to a height difference between the focusing mechanism and the bearing structure.

According to another aspect of the present disclosure, the present disclosure further provides a method for assembling a camera module, including the following steps (a), (b), (c), (d), (e), (f) and (g):

(a) disposing inversely a focusing mechanism and a bearing structure on a jig;

(b) adjusting the jig, and fixing the focusing mechanism and the bearing structure on the jig;

(c) placing sequentially at least one optical lens in an internal space of the bearing structure, where the at least one optical lens includes at least one optical lens serving as an adjustable lens;

(d) fixing an optical lens other than the adjustable lens to complete an assembly of the adjustable optical lens assembly;

(e) connecting the assembled adjustable optical lens assembly to a photosensitive device such that the adjustable optical lens assembly is disposed on a photosensitive path of a photosensitive chip included in the photosensitive device;

(f) conducting electrically a pre-assembled camera module, collecting an imaging of the camera module, and calculating an adjustment method and an adjustment amount of the adjustable lens;

(g) adjusting the adjustable lens based on the adjustment amount so that the imaging of the camera module satisfies a resolution requirement; and (h) fixing the adjustable lens to complete an assembly of the camera module.

According to an embodiment of the present disclosure, in the step (a), a first bearing portion and a second bearing portion of the jig are respectively used to hold the bearing structure and the focusing mechanism, and first bearing portion matching a shape and a size of the bearing structure, and the second bearing portion matching a shape and size of the focusing mechanism.

According to an embodiment of the present disclosure, in the step (b), the bearing structure and the focusing mechanism are fixed by at least two air channels of the jig, each penetrating through a top and a bottom of the jig, and the air channels are respectively disposed in the first bearing portion and the second bearing portion and further adapted to allow a suction nozzle or a vacuum device to fix the bearing structure and the focusing mechanism through the air channels.

According to an embodiment of the present disclosure, in the step (c), optical lenses other than the adjustable lens are assembled sequentially into an internal space of the bearing structure one by one, or a part of the optical lenses other than the adjustable lens are fitted into one body and, the fitted optical lens and an un-fitted optical lens are sequentially assembled into the bearing structure.

According to an embodiment of the present disclosure, in the step (d), the adjustable lens is pre-assembled in the bearing structure by glue without fixing, optical lenses other than the adjustable lens are directly fixed into the bearing structure, the glue used in the pre-assembly is a mixed adhesive of a thermosetting adhesive and a UV adhesive, and the glue is semi-cured by ultraviolet exposure to realize the pre-assembly.

According to an embodiment of the present disclosure, in the step (g), the adjustable lens is adjusted based on at least one adjustment channel of the bearing structure, the at least one adjustment channel connects the internal space of the bearing structure to an external environment, corresponds to the adjustable lens, and is suitable for adjusting an assembly position of the adjustable lens outside the bearing structure.

According to an embodiment of the present disclosure, in the step (a), the bearing structure is mounted inside the focusing mechanism and used as a holder of the focusing mechanism, and moves as the focusing mechanism is powered on.

According to an embodiment of the present disclosure, in the step (a), the focusing mechanism is connected with the bearing structure in advance as a whole or the bearing structure is pre-assembled inside the focusing mechanism, so that the focusing mechanism is connected to the bearing structure in in the step (d).

According to an embodiment of the present disclosure, in the method, a top end surface of the bearing structure is higher than a top end surface of the focusing mechanism, the jig has a groove adapted to accommodate a portion of the bearing structure higher than the focusing mechanism, and a depth of the groove is equal to a height difference between the focusing mechanism and the bearing structure.

According to an embodiment of the present disclosure, in the step (h), a top of the bearing structure has at least one fixing channel, and the at least fixing channel corresponds to the adjustable lens and is adapted to allow glue injected through the fixing channel after the adjustable lens is adjusted, to fix the adjustable lens.

According to an embodiment of the present disclosure, in the step (h), by injecting glue in the adjustment channel, after the glue is cured, the adjustable lens is fixed and the adjustment channel is sealed.

The present disclosure provides a split lens assembly module, including:

a focusing mechanism; and a lens assembly, where the lens assembly includes at least two optical lenses, at least one lens barrel member and a bearing structure, each of the at least one lens barrel member holds at least one optical lens to form at least one to-be-adjusted lens assembly, the bearing structure holds at least one optical lens to form a fixing lens assembly, the to-be-adjusted lens assembly is pre-assembled on the fixing lens assembly, the to-be-adjusted lens assembly is suitable for being adjusted relative to an assembly position of the fixing lens assembly, the fixing lens assembly is mounted inside the focusing mechanism through the bearing structure, and moves as the focusing mechanism is powered on, which is suitable for focusing.

According to an embodiment of the present disclosure, the lens barrel member is pre-assembled on a top of the bearing structure by glue to realize a pre-assembly of the to-be-adjusted lens assembly and the fixing lens assembly.

According to an embodiment of the present disclosure, the glue used in a pre-assembly is a mixed adhesive of a UV adhesive and a thermosetting adhesive, the glue is semi-cured by ultraviolet exposure to realize the pre-assembly, and the glue is completely cured by a baking treatment to fix the entire split lens assembly module.

According to an embodiment of the present disclosure, an assembly position of the to-be-adjusted lens assembly is suitable for being adjusted in at least one direction.

According to an embodiment of the present disclosure, the focusing mechanism is suitable for being selected from a voice coil motor, a piezoelectric ceramic motor or a liquid crystal motor.

According to an embodiment of the present disclosure, the bearing structure is mounted inside the focusing mechanism and moves along the focusing mechanism.

According to an embodiment of the present disclosure, a top end surface of the bearing structure is higher than a top end surface of the focusing mechanism.

According to an embodiment of the present disclosure, one optical lens is fixed in an internal space of the lens barrel member, and three optical lenses are fixed in an internal space of the bearing structure along a height direction of the bearing structure.

According to another aspect of the present disclosure, the present disclosure further provides a camera module, including:

a photosensitive device, the photosensitive device including a photosensitive chip; and a split lens assembly module, the split lens assembly module being disposed on a photosensitive path of the photosensitive chip, where the split lens assembly module includes a focusing mechanism and a lens assembly, the lens assembly includes at least two optical lenses, at least one lens barrel member and a bearing structure, each of the at least one lens barrel member holds at least one optical lens to form at least one to-be-adjusted lens assembly, the bearing structure holds at least one optical lens to form a fixing lens assembly, the to-be-adjusted lens assembly is pre-assembled on the fixing lens assembly, the to-be-adjusted lens assembly is suitable for being adjusted relative to an assembly position of the photosensitive chip, the fixing lens assembly is mounted inside the focusing mechanism through the bearing structure, and moves as the focusing mechanism is powered on, which is suitable for focusing.

According to an embodiment of the present disclosure, an assembly position of the to-be-adjusted lens assembly is suitable for being adjusted in at least one direction, so that after an adjustment a center axis of the split lens assembly module coincides with a center axis of the photosensitive chip or is within an allowable range of deviation.

According to an embodiment of the present disclosure, the photosensitive device further includes an optical filter, a lens holder, and a circuit board, where the optical filter is connected to an inner wall of the lens holder and located above the photosensitive chip, the photosensitive chip is mounted on the circuit board, and the circuit board is mounted on a bottom of the lens holder, so that the photosensitive chip is located inside the lens holder and separates from the inner wall of the lens holder.

According to an embodiment of the present disclosure, the photosensitive device further includes an optical filter, a lens holder, and a circuit board, where the optical filter and the photosensitive chip are both mounted inside the lens holder and connected to an inner wall of the lens holder, the optical filter is disposed above the photosensitive chip, and the circuit board is mounted on a bottom of the lens holder.

According to another aspect of the present disclosure, the present disclosure further provides a method for assembling a split lens assembly module, the method includes the following steps (A), (B) and (C):

(A) assembling at least one optical lens in an internal space of a lens barrel member to form a to-be-adjusted lens assembly;

(B) assembling at least one optical lens in an internal space of a bearing structure to form a fixing lens assembly, where the bearing structure is disposed inside a focusing mechanism and moves as the focusing mechanism is powered on; and (C) pre-assembling the to-be-adjusted lens assembly and the fixing lens assembly to form the split lens assembly module with the adjustable to-be-adjusted lens assembly.

According to an embodiment of the present disclosure, in the step (A), the lens barrel member is inversely fixed in a groove of a jig, and the optical lenses are mounted to the internal space of the lens barrel member along a height direction of the lens barrel member and fixed.

According to an embodiment of the present disclosure, in the step (B), the bearing structure and the focusing mechanism are respectively inversely placed on a bottom of the lens barrel member and a second bearing portion of the jig, and the optical lenses are mounted to the internal space of the bearing structure along a height direction of the bearing structure and fixed.

According to an embodiment of the present disclosure, in the step (C), before pre-assembling the to-be-adjusted lens assembly and the fixing lens assembly, g the bottom of the lens barrel member is coated with glue or a top of the bearing structure is coated with the glue, and a pre-assembly between the bearing structure and the lens barrel member is realized by glue, where an assembly position of the to-be-adjusted lens assembly is suitable for being adjusted in at least one direction.

According to an embodiment of the present disclosure, in the method, the lens barrel member and the bearing structure are held by a first bearing portion of the jig, and the focusing mechanism is held by the second bearing portion, the groove formed by the first bearing portion and the second bearing portion is adapted to accommodate the lens barrel member and a portion of the bearing structure higher than the focusing mechanism, and a depth of the groove is equal to a sum of a height of the lens barrel member and a height of the portion of the bearing structure higher than the focusing mechanism.

According to an embodiment of the present disclosure, in the step (B), the bearing structure and the focusing mechanism are respectively inverted and fixed to a first bearing portion and a second bearing portion of a jig, and the optical lenses are mounted to the internal space of the bearing structure along a height direction of the bearing structure and fixed.

According to an embodiment of the present disclosure, in the step (C), the fixing lens assembly is removed from the jig, the assembled to-be-adjusted lens assembly is pre-assembled on a top of the fixing lens assembly, and an assembly position of the to-be-adjusted lens assembly is suitable for being adjusted in at least one direction relative to a spatial position of the fixing lens assembly.

According to an embodiment of the present disclosure, in the step (C), the pre-assembly of the to-be-adjusted lens assembly and the fixing lens assembly is realized by glue, by coating the top of the fixing lens assembly or a bottom of the to-be-adjusted lens assembly with glue.

According to an embodiment of the present disclosure, in the method, a shape and a size of the first bearing portion matches a shape and size of the bearing structure, and a shape and a size of the second bearing portion matches the lens barrel member, where the groove formed by the first bearing portion and the second bearing portion is adapted to accommodate a portion of the bearing structure higher than the focusing mechanism, and a depth of the groove is equal to a height difference between the bearing structure and the focusing mechanism.

According to an embodiment of the present disclosure, in the method, the bearing structure and the focusing mechanism are fixed by at least two air channels of the jig, the air channels each penetrating a top and a bottom of the jig, and the air channels are respectively disposed at the first bearing portion and the second bearing portion, which is suitable for fixing the bearing structure and the focusing mechanism through the air channels using a suction nozzle or a vacuum device.

According to an embodiment of the present disclosure, in the method, directions of six axes of X, Y, Z, U, V and W of the assembly position of the to-be-adjusted lens assembly are all suitable for being adjusted.

According to an embodiment of the present disclosure, in the step (B), the bearing structure is mounted inside the focusing mechanism and used as a holder of the focusing mechanism, and moves along the focusing mechanism as the focusing mechanism is powered on.

According to an embodiment of the present disclosure, in the step (B), the focusing mechanism is connected with the bearing structure in advance as a whole or the bearing structure is pre-assembled inside the focusing mechanism, such that the focusing mechanism is connected to the bearing structure in the step (C).

DETAILED DESCRIPTION OF EMBODIMENTS

The following description is provided to disclose the present disclosure to enable those skilled in the art to implement the present disclosure. Preferred embodiments are provided in the following description only as examples and modifications will be apparent to those skilled in the art. The general principles of the present disclosure defined in the following description may be applied to other embodiments, alternatives, modifications, equivalents, and other technical solutions without departing from the spirit and scope of the present disclosure.

It should be understood by those skilled in the art that in the disclosure of the present disclosure, the orientations or positional relationships indicated by the terms "longitudinal", "lateral", "up", "down", "front", "back", "left", "right", "vertical", "horizontal", "top", "bottom", "inner", "outer", etc., are based on the orientations or positional relationships shown in the accompanying drawings. These terms are merely for convenience of describing the present disclosure and simplifying the description, and do not indicate or imply that the device or element referred to has to have a particular orientation, and be constructed and operated in a particular orientation, and thus the above terms should not be construed as limiting the present disclosure.

In a conventional adjustable focus camera module, a lens assembly module generally includes a lens assembly and a focusing mechanism. The lens assembly includes an optical lens and a lens barrel that holds the lens, and the focusing mechanism includes a holder, which is connected to other components of the focusing mechanism. The holder holds a moving part, is internally threaded, and is matched with the lens assembly by a thread or other approaches, that is, the holder is connected with the lens barrel, so that the lens assembly may be fixed on the holder to move together with the holder, thereby achieving the objective of focusing.

In the present disclosure, by improving the lens barrel and the holder of the focusing mechanism, the lens barrel and the holder of the focusing mechanism are designed as a whole to reduce the assembly process, reduce the manufacturing cost, and improve the image quality.

Figure 1:
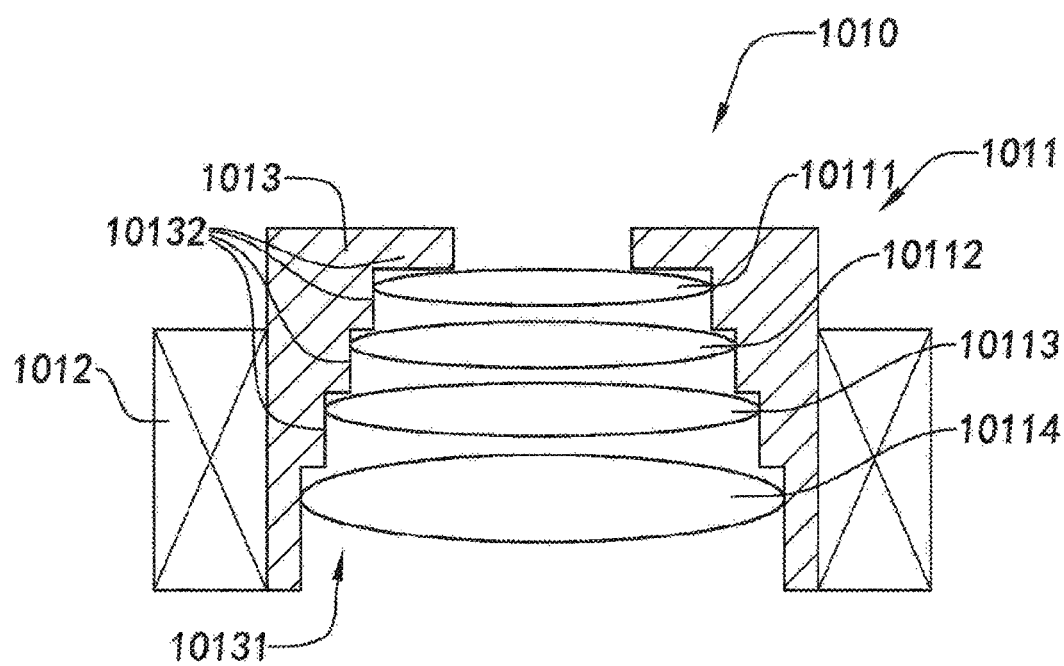
FIG. 1 is a schematic cross-sectional diagram of a lens assembly integrating a focusing mechanism according to a first preferred embodiment of the present disclosure.

FIG. 1 illustrates a lens assembly module integrating a focusing mechanism according to a first preferred embodiment of the present disclosure. As shown in FIG. 1, a lens assembly module 1010 includes at least one optical lens 1011, a focusing mechanism 1012, and a bearing structure 1013. Each of the optical lenses 1011 is mounted in an accommodating cavity 10131 of the bearing structure 1013 along the height direction of the bearing structure 1013 and is fixed therein. The bearing structure 1013 is mounted inside the focusing mechanism 1012, and used as the holder of the focusing mechanism 1012. The bearing structure 1013 has a mounting position the same as that of a conventional focusing mechanism, and connects other components of the focusing mechanism 1012. The bearing structure 1013 can move as the focusing mechanism 1012 is powered on, and directly drives the optical lens 1011 to move during the movement, to achieve the focusing.

The at least one optical lens 1011 of the present preferred embodiment is implemented as four optical lenses 1011, i.e., a first optical lens 10111, a second optical lens 10112, a third optical lens 10113, and a fourth optical lens 10114.

It is worth mentioning that the bearing structure 1013 has the functions of the lens barrel and the motor holder in the conventional lens assembly module. In the present disclosure, the bearing structure 1013 is used as the holder for both the lens barrel and the focusing mechanism. The bearing structure 1013 can move inside the focusing mechanism 1012, and can also hold the optical lens 1011. The optical lens 11 is suitable to be made of an opaque material, which can prevent external stray lights from entering the lens assembly module 1010 through a place other than an incident hole.

The bearing structure 1013 may be implemented in the following three methods: (1) when the holder is designed for the focusing mechanism 1012, besides the holder function, the holder is further made to function as a lens barrel, which conforms to the size of a lens barrel and can be used to hold a lens; (2) when the holder is designed for the lens barrel, besides holding the lens, the holder functions as a holder of the focusing mechanism, to be further mounted in the focusing mechanism to function as the holder of the focusing mechanism; (3) the lens barrel and the holder of the focusing mechanism are fabricated as an assembly. In short, the above fabrication methods are merely used as examples. Those skilled in the art may understand that whether the lens barrel is used as the holder of the focusing mechanism or the holder of the focusing mechanism is used as the lens barrel, the fabrication method of the bearing structure 1013 may also be implemented in other methods, as long as the bearing structure 1013 has the functions of the lens barrel and the holder of the focusing mechanism.

The focusing mechanism 1012 is suitable for implementation as a voice coil motor (VCM), a piezoelectric ceramic motor, a liquid crystal motor, and the like.

Furthermore, the bearing structure 1013 has at least one fixing portion 10132. The fixing portion 10132 extends from the inner wall of the bearing structure 1013 toward the accommodating cavity 10131 to form a boss for placing the optical lenses 1011. The number of the fixing portions 10132 may be equal to the number of the optical lenses 1011. In an implementation of the present preferred embodiment, the number of the fixing portions 10132 is four. When the lens assembly module 1010 is inverted to mount the optical lenses 1011, each of the optical lenses 1011 can be placed on a surface of a corresponding fixing portion 10132, and then the optical lenses 1011 are fixed. Through the fixing portion 10132, each of the optical lenses 1011 can be firmly placed to facilitate fixing the optical lenses to the bearing structure 1013.

Figure 2:
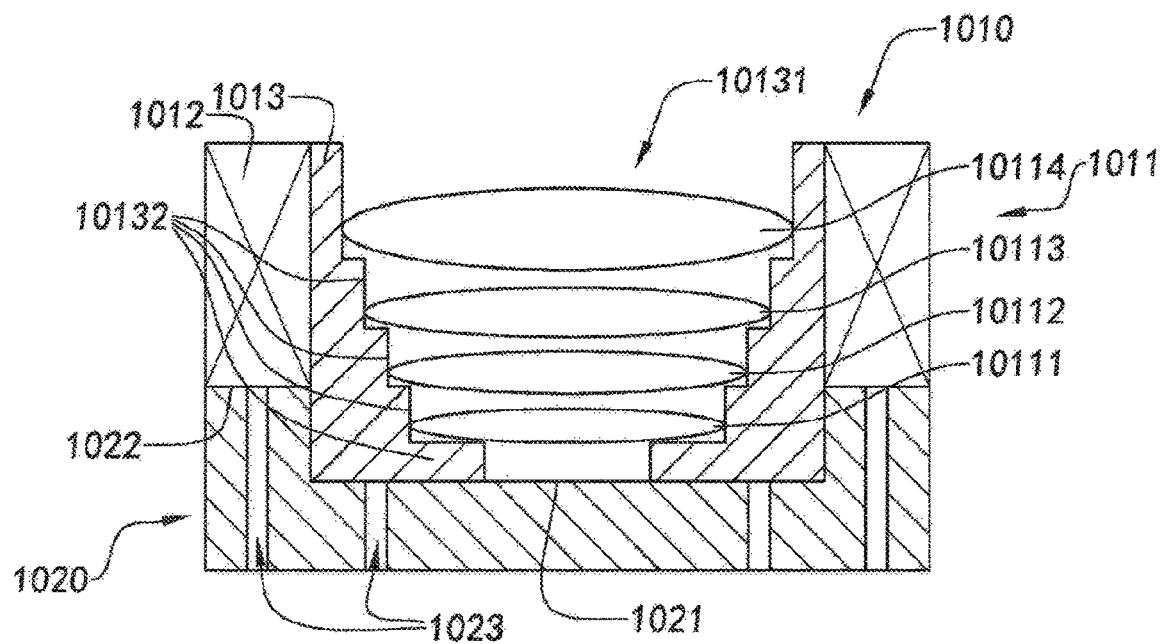
FIG. 2 is a schematic diagram of a first assembling method of the lens assembly integrating a focusing mechanism according to the above preferred embodiment of the present disclosure.
Figure 6:
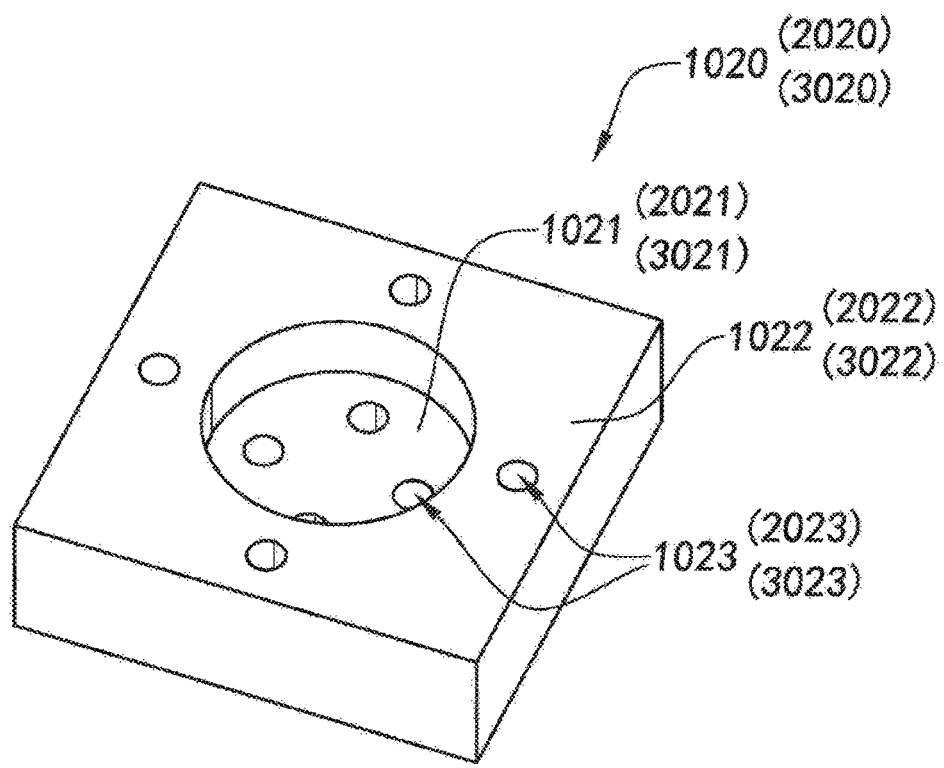
FIG. 6 is a schematic structural diagram of a jig used in the assembly process of the lens assembly integrating a focusing mechanism according to the above preferred embodiment of the present disclosure.
Figure 10:
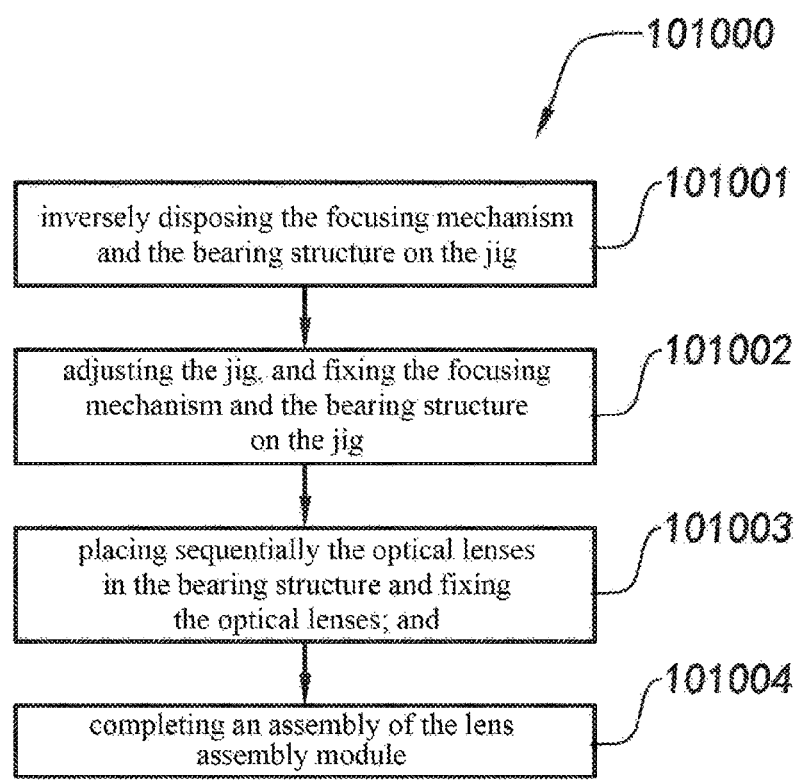
FIG. 10 is a flowchart of a method for assembling the lens assembly integrating a focusing mechanism according to the above preferred embodiment of the present disclosure.

Referring to FIG. 2, FIG. 6 and FIG. 10, the method for assembling the lens assembly module 1010 and the jig 1020 used for assisting the assembly will be described. The jig 1020 includes a first bearing portion 1021 and a second bearing portion 1022, and has at least two air channels 1023. The second bearing portion 1022 is disposed at the periphery of the first bearing portion 1021. The first bearing portion 1021 and the second bearing portion 1022 are located on the top of the jig 1020. The air channels 1023 penetrates through the top and the bottom of the jig 1020 for adsorption. At least one of the air channels 1023 is disposed on the first bearing portion 1021, and at least one of the air channels 1023 is disposed on the second bearing portion 1022, for fixing the bearing structure 1013 and the focusing mechanism 1012 respectively. For firmer fixation, it is suitable for arranging multiple air channels 1023 evenly to fix the bearing structure 1013 and the focusing mechanism 1012 from different angles. For example, four air channels 1023 may be evenly arranged on the first bearing portion 1021, and four air channels 1023 may be evenly arranged on the second bearing portion 1022.

The first bearing portion 1021 is implemented as a groove in the present preferred embodiment, that is, there is a predetermined distance between the top end surface of the first bearing portion 1021 and the top end surface of the second bearing portion 1022. The top end surface of the first bearing portion 1021 is lower than the top end surface of the second bearing portion 1022. The shape and size of the first bearing portion 1021 match the shape and size of the bearing structure 1013, and the first bearing portion 1021 is used to hold the bearing structure 1013 in the assembly process. The shape and size of the second bearing portion 1022 matches the shape and size of the focusing mechanism 1012, and the second bearing portion 1022 is used to hold the focusing mechanism 1012 in the assembling process. In the assembling process, the bearing structure 1013 and the focusing mechanism 1012 are respectively inversely disposed on the first bearing portion 1021 and the second bearing portion 1022. In the process of mounting the optical lens 1011, the bearing structure 1013 is fixed by the air channel 1023 disposed at the first bearing portion 1021, and the focusing mechanism 1012 is fixed by the air channel 1023 disposed at the second bearing portion 1022.

Further, the shape of the jig 1020 has to match the shape of the lens assembly module 1010. In the present preferred embodiment, the top end surface of the bearing structure 1013 is higher than the top end surface of the focusing mechanism 1012. Therefore, the first bearing portion 1021 is implemented as a groove for accommodating the portion of the bearing structure 1013 higher than the focusing mechanism 1012. A depth of the groove is a height difference between the bearing structure 1013 and the focusing mechanism 1012.

It is worth mentioning that the bearing structure 1013 and the focusing mechanism 1012 may be fixed through the air channels 1023 by a suction nozzle or other vacuum devices.

Referring to FIG. 10, the assembly method 101000 for assembling the lens assembly module 1010 includes the following steps:

step (101001): inversely disposing the focusing mechanism 1012 and the bearing structure 1013 on the jig 1020;

step (101002): adjusting the jig 1020, and fixing the focusing mechanism 1012 and the bearing structure 1013 on the jig 1020;

step (101003): placing sequentially the optical lenses 1011 in the bearing structure 1013 and fixing the optical lenses 1011; and step (101004): completing an assembly of the lens assembly module 1010.

It is worth mentioning that in the step (101001), since the bearing structure 1013 has been designed to have dual functions of the lens barrel and the holder of the focusing mechanism when it is designed, the focusing mechanism 1012 and the bearing structure 1013 may be assembled in one of the following three methods: (a) the focusing mechanism 1012 may be connected to the bearing structure 1013 in advance so that the bearing structure 1013 has the function of the holder of the focusing mechanism 1012, and the two as a whole are inversely disposed on the jig 1020 such that the bearing structure has the function of the lens barrel; (b) the focusing mechanism 1012 and the bearing structure 1013 are inversely disposed on the matched jig 1020 respectively, then the assembly of the two is performed in the step (101004); (c) after fixing the optical lenses 1011 inside the bearing structure 1013 such that the bearing structure 1013 has the function of the lens barrel and the bearing structure 1013 is assembled with the optical lenses 1011 as a whole, the bearing structure 1013 and the focusing mechanism 1012 are assembled such that the bearing structure has the function of the holder of the focusing mechanism 1012.

In the step (101002), by adjusting the jig 1020 to be matched with a suction nozzle or a vacuum device, the suction nozzle or the vacuum device applies a pressure to the air channels 1023 at the bottom of the jig 1020, so that adsorption can be performed through the air channels 1023 to fix the focusing mechanism 1012 and the bearing structure 1013. As such, the focusing mechanism 1012 and the bearing structure 1013 are respectively fixed to the second bearing portion 1022 and the first bearing portion 1021 of the jig 1020, avoiding sliding, shaking, and offsetting of the second bearing portion 1022 and the first bearing portion 1021 during a subsequent assembly process, thereby reducing the assembly deviation and ensuring the assembly precision.

In the step (101003), the optical lenses 1011, such as the four optical lenses 1011 in the present preferred embodiment, are placed. In present preferred embodiment, the four optical lens 1011 are sequentially placed on the first optical lens 10111, the second optical lenses 10112, the third optical lens 10113, and the fourth optical lens 10114 one by one, which is suitable for fixing the optical lenses 1011 by the thermosetting adhesive. The optical lens may be fixed each time one optical lens is placed, or the optical lenses may be fixed after all optical lenses are placed, depending on the actual situation. Those skilled in the art may understand that the assembly method of the optical lenses 1011 may be selected according to the structure of the inner wall of the bearing structure 1013, and the optical lenses 1011 may alternatively be fixed by welding.

Figure 4:
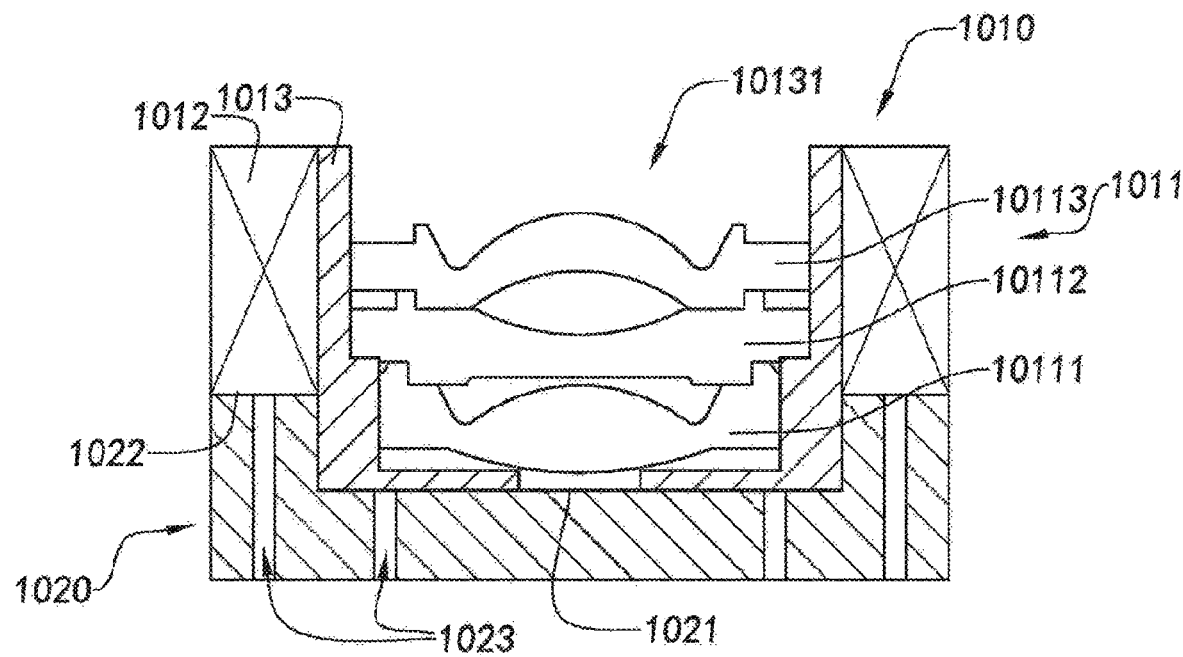
FIGS. 4-5 are schematic diagrams of a second assembling method of the lens assembly integrating a focusing mechanism according to the above preferred embodiment of the present disclosure.
Figure 5:
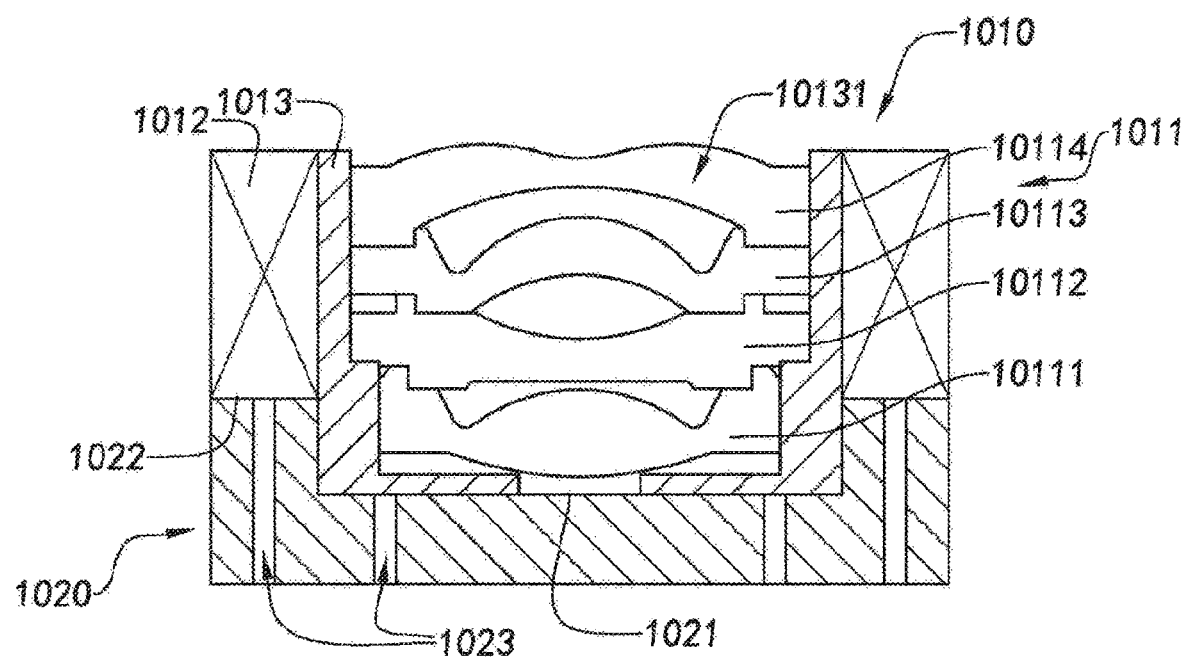

In addition, referring to FIG. 4 and FIG. 5, in the present disclosure, the method shown in FIG. 4 and FIG. 5 may also be used to assemble the camera module 1010. As shown in FIG. 4 and FIG. 5, a part of the optical lenses 1011 are fixed as a whole before assembly, and the optical lenses 1011 fixed as a whole and other un-fitted optical lenses are sequentially assembled into the bearing structure 1013, to complete the assembly of the lens assembly module 1010. In this assembly method, the first optical lens 10111, the second optical lens 10112, and the third optical lens 10113 are first fitted and then placed into the accommodating cavity 10131 of the bearing structure 1013. Then, the fourth optical lens 10114 is placed, and the optical lenses 1011 are fixed to complete the assembly of the lens assembly module 1010. It may be understood by those skilled in the art that any of the optical lenses 1011 may be fitted before the assembly, and then the assembly is performed in sequence. For example, the second optical lens 10112 and the third optical lens 10113 may be fitted together as a whole before assembly. In assembling, the first optical lens 10111, the second optical lens 10112 and the third optical lens 10113 fitted and assembled together, and the fourth optical lens 10114 are sequentially placed, and then fixed by a thermosetting adhesive. Alternatively, the four optical lens 1011 may be fitted and placed in the bearing structure 1013 as a whole.

In the step (101004), the suction nozzle or other vacuum device is removed, the lens assembly module 1010 is taken out from the jig 1020, and the assembly of the lens assembly module 1010 is completed. Here, the lens assembly module 1010 may be taken out by injecting air through the air channels 1023. By exerting an opposite force on the lens assembly module 1010, the lens assembly module 1010 is pushed out, and then taken out. Other methods may also be adopted to take out the lens assembly module 1010 according to the actual situation.

Figure 3:
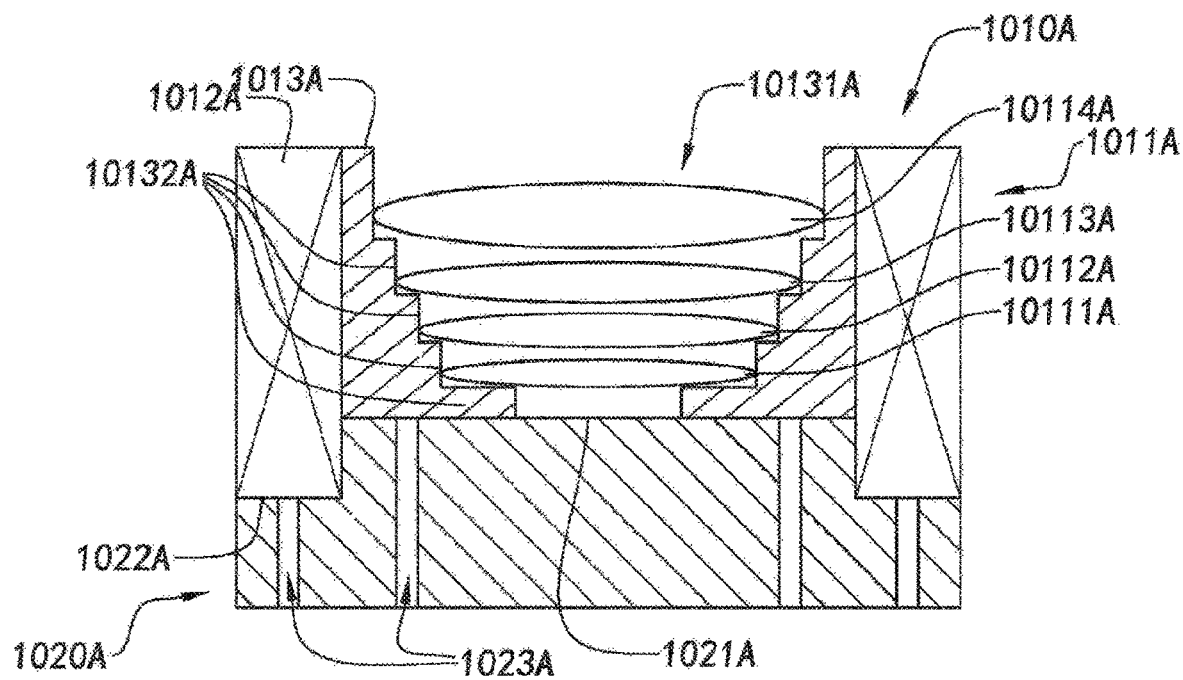
FIG. 3 is a modified embodiment of the first assembling method of the lens assembly integrating a focusing mechanism according to the above preferred embodiment of the present disclosure.
Figure 7:
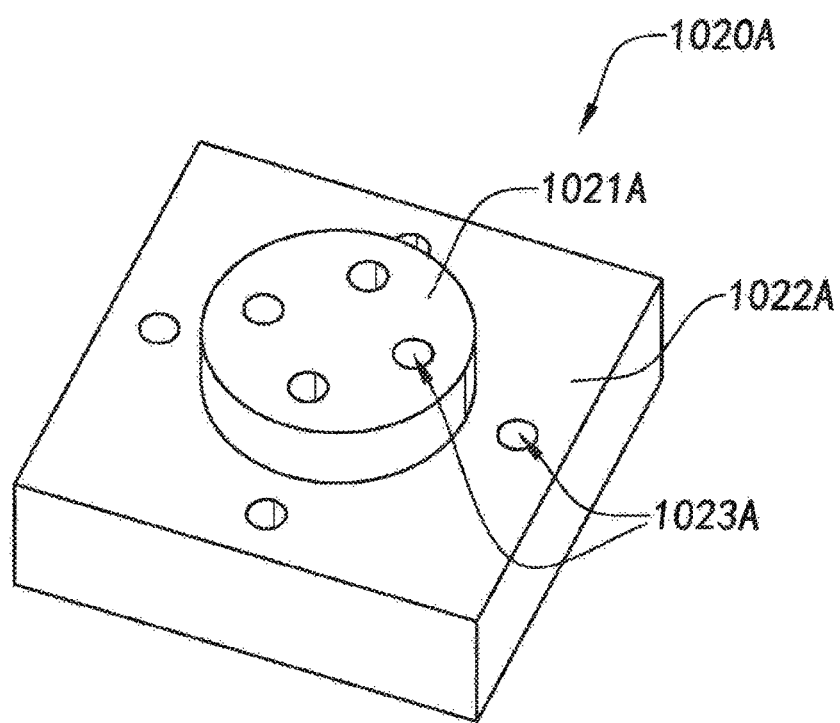
FIG. 7 is a modified embodiment of the jig used in the assembly process of the lens assembly integrating a focusing mechanism according to the above preferred embodiment of the present disclosure.

Referring to FIG. 3 and FIG. 7, in a modified embodiment of the above preferred embodiment, the lens assembly module and the jig 1020 have variations. In this modified embodiment, the jig 1020A is used to assist the assembly of the lens assembly module 1010A. Here, the jig 1020A matches the lens assembly module 1010A.

The lens assembly module 1010A includes multiple optical lenses 1011A, a focusing mechanism 1012A, and a bearing structure 1013A. The bearing structure 1013A serves as a holder of the focusing mechanism 1012A and has an accommodating cavity 10131A for accommodating the optical lens 1011A, which achieves functions of the lens barrel and the holder of the focusing mechanism. Here, the bearing structure 1013A can move inside the focusing mechanism 1012A as the focusing mechanism 1012A is powered on, to perform focusing.

Further, the bearing structure 1013A has at least one fixing portion 10132A. The fixing portion 10132A extends from the inner wall of the bearing structure 1013A toward the accommodating cavity 10131A to form a boss to place the optical lenses 1011A. In an implementation of the present preferred embodiment, there are four fixing portions 10132A. When the lens assembly module 1010A is inverted to mount the optical lenses 1011A, each of the optical lenses 1011A can be placed on the corresponding surface of the fixing portion 10132A. Then, the optical lenses 1011A are fixed. By the fixing portion 10132A, the optical lenses 1011A can be stably placed so as to be easily fixed to the bearing structure 1013A.

The jig 1020A includes a first bearing portion 1021A and a second bearing portion 1022A, and has multiple air channels 1023A. The second bearing portion 1022A is disposed at the periphery of the first bearing portion 1021A. The first bearing portion 1021A and the second bearing portion 1022A are located on the top of the jig 1020A. The air channels 1023A penetrates through the top and the bottom of the jig 1020A for adsorption. At least one of the air channels 1023A is disposed on the first bearing portion 1021A, and at least one of the air channels 1023A is disposed on the second bearing portion 1022A, for fixing the bearing structure 1013A and the focusing mechanism 1012A, respectively. In the present preferred embodiment, four air channels 1023A may be evenly arranged on the first bearing portion 1021A, and four air channels 1023A may be evenly arranged on the second bearing portion 1022A.

The first bearing portion 1021A is implemented as a boss in the present preferred embodiment, that is, there is a predetermined distance between the top end surface of the first bearing portion 1021A and the top end surface of the second bearing portion 1022A. The top end surface of the first bearing portion 1021A is higher than the top end surface of the second bearing portion 1022A. The shape and size of the first bearing portion 1021A match the shape and size of the bearing structure 1013A, and in the assembly process, the first bearing portion 1021A is used to hold the bearing structure 1013A. The shape and size of the second bearing portion 1022A match the shape and size of the focusing mechanism 1012A, and in the assembling process, the focusing mechanism 1012A is used to hold the focusing mechanism 1012A. In the assembling process, the bearing structure 1013A and the focusing mechanism 1012A are inversely disposed on the first bearing portion 1021A and the second bearing portion 1022A respectively. In the process of mounting the optical lens 1011A, the bearing structure 1013A is fixed by the air channel 1023A disposed at the first bearing portion 1021A, and the focusing mechanism 1012A is fixed by the air channel 1023A disposed at the second bearing portion 1022A.

Further, the shape of the jig 1020A has to match the shape of the lens assembly module 1010A. In the present preferred embodiment, the top end surface of the bearing structure 1013A is lower than the top end surface of the focusing mechanism 1012A, and a groove is formed therebetween. Therefore, the first bearing portion 1021A is implemented as a boss to match the portion of the bearing structure 1013A lower than the focusing mechanism 1012A. A depth of the boss is a height difference between the bearing structure 1013A and the focusing mechanism 1012A.

It is worth mentioning that the bearing structure 1013A and the focusing mechanism 1012A may be fixed through the air channels 1023A by a suction nozzle or other vacuum devices to facilitate mounting the optical lens 1011A.

It is more worth mentioning that the structure of the jig 1020A should match the lens assembly module 1010A. When the top end surface of the focusing mechanism 1012A is flush with the top end surface of the bearing structure 1013A, i.e., both are on the same plane, the top end surface of the first bearing portion 1021A and the top end surface of the second bearing portion 1022A of the jig 1020A are also on the same plane for holding and fixing the bearing structure 1013A and the focusing mechanism 1012A, respectively.

Figure 8:
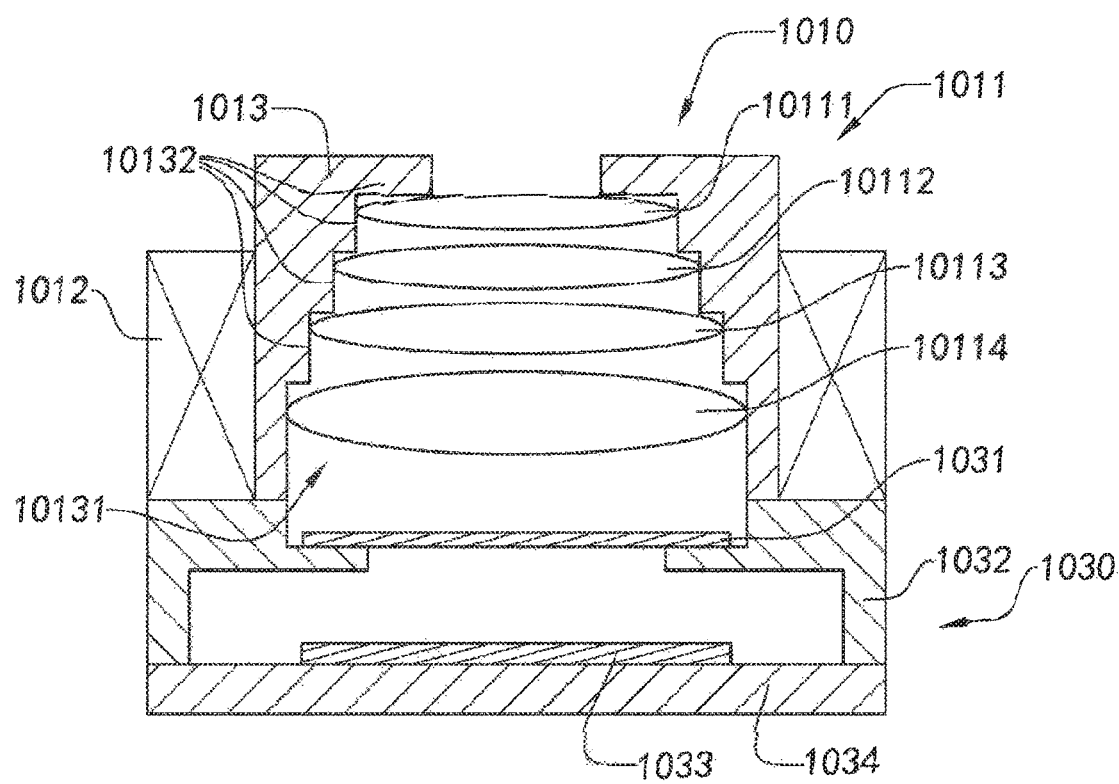
FIG. 8 is a schematic cross-sectional diagram of a camera module including the lens assembly integrating a focusing mechanism according to the above preferred embodiment of the present disclosure.

FIG. 8 illustrates a camera module including the lens assembly module 1010 in the above preferred embodiment. Referring to FIG. 8, a camera module includes the lens assembly module 1010 and a photosensitive device 1030. The photosensitive device 1030 includes an optical filter 1031, a lens holder 1032, a photosensitive chip 1033, and a circuit board 1034. The photosensitive device 1030 is manufactured by a COB (chip on board) process. The optical filter 1031 is mounted inside an upper portion of the lens holder 1032, connected to the lens holder 1032 and located above the photosensitive chip 1033. The photosensitive chip 1033 is mounted on the circuit board 1034, and separates from the inner wall of the lens holder 1032. The circuit board 1034 is mounted on the bottom of the lens holder 1032 and allows the photosensitive chip 1033 to be mounted in the cavity inside the lens holder 1032. The lens assembly module 1010 is mounted on the top of the photosensitive device 1030 and located on the photosensitive path of the photosensitive chip 1033. Lights reflected by an object pass through the lens assembly module 1010 and enter into the camera module, and are received by the photosensitive chip 1033 for a photoelectric conversion, so that an object-related image can be obtained by camera module subsequently.

Further, the focusing mechanism 1012 and the bearing structure 1013 are both fixedly assembled on the top of the lens holder 1032 and are connected with the lens holder 1032, so that each of the optical lenses 1011 is located on the photosensitive path of the photosensitive chip 1033, which facilitates subsequent imaging, and enables the camera module to operate more stably and reliably.

Figure 9:
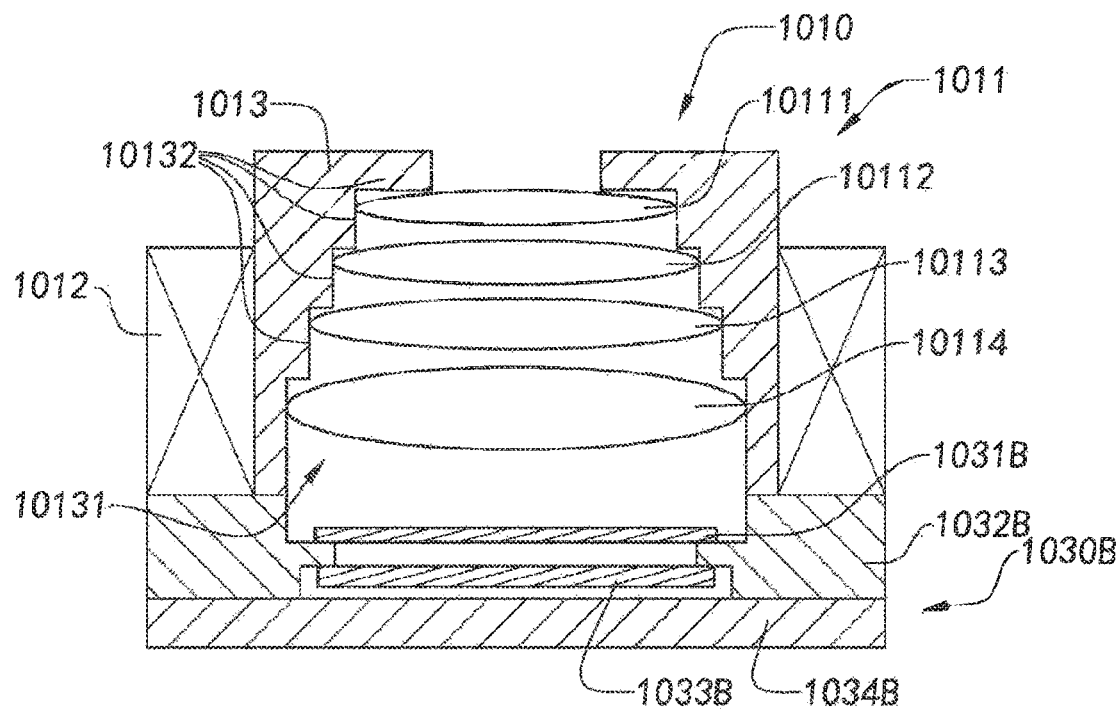
FIG. 9 is a modified embodiment of the camera module including the lens assembly integrating a focusing mechanism according to the above preferred embodiment of the present disclosure.

FIG. 9 shows another embodiment of a camera module including the lens assembly module 1010 in the above preferred embodiment. Referring to FIG. 9, a camera module includes the lens assembly module 1010 and a photosensitive device 1030B. The photosensitive device 1030B includes an optical filter 1031B, a lens holder 1032B, a photosensitive chip 1033B, and a circuit board 1034B. The photosensitive device 1030B is manufactured by a flip chip process. The optical filter 1031B is mounted inside the upper portion of the lens holder 1032B and is connected to the lens holder 1032B. The photosensitive chip 1033B is mounted below the optical filter 1031B and separates from the optical filter 1032B. The photosensitive chip 1033B is directly connected to the lens holder 1032B, and separates from the circuit board 1034B mounted at the bottom of the lens holder 1032B. The lens holder 1032B has an electrical function, and a corresponding electrical element is implanted inside the lens holder 1032B, which ensures the imaging of the camera module and a thinner and more compact photosensitive device 1030B. As a result, the size of the camera module is smaller.

The lens assembly module 1010 is mounted on the top of the photosensitive device 1030B and located on the photosensitive path of the photosensitive chip 1033B. Lights reflected by an object pass through the lens assembly module 1010 and enter into the camera module, and are received by the photosensitive chip 1033B for a photoelectric conversion, so that an object-related image can be obtained by the camera module subsequently.

Further, the focusing mechanism 1012 and the bearing structure 1013 are both fixedly assembled on the top of the lens holder 1032B and are connected with the lens holder 1032B, so that each of the optical lenses 1011 is located on the photosensitive path of the photosensitive chip 1033B, which facilitates subsequent imaging, and enables the camera module to operate more stably and reliably.

In a conventional adjustable focus camera module, a lens assembly module generally includes a lens assembly and a focusing mechanism. Here, the lens assembly includes an optical lens and a lens barrel that holds the lens, and the focusing mechanism includes a holder, which is connected to other components of the focusing mechanism. The holder holds moving parts, and is internally threaded. The holder matches the lens assembly by a thread or other approaches, that is, the holder is connected with the lens barrel, so that the lens assembly may be fixed on the holder to move together with the holder, thereby achieving the objective of focusing. In addition, once the optical lens in the conventional optical lens assembly is packaged in the lens barrel, its assembly position cannot be adjusted, and the image quality of the optical lens cannot be adjusted in the process of assembling the lens assembly or the camera module.

In the present disclosure, by improving the lens barrel and the holder of the focusing mechanism, the lens barrel and the holder of the focusing mechanism are designed as a whole to reduce the assembly process, reduce the manufacturing cost, and improve the image quality, and at least one optical lens are pre-assembled. In the subsequent process, the assembly position of the optical lens is adjusted to obtain an adjustable optical lens assembly, so that the image quality of the camera module in the assembly process is timely adjusted with an objective, improving the manufacturing yield of the lens assembly and the camera module.

Figure 11A:
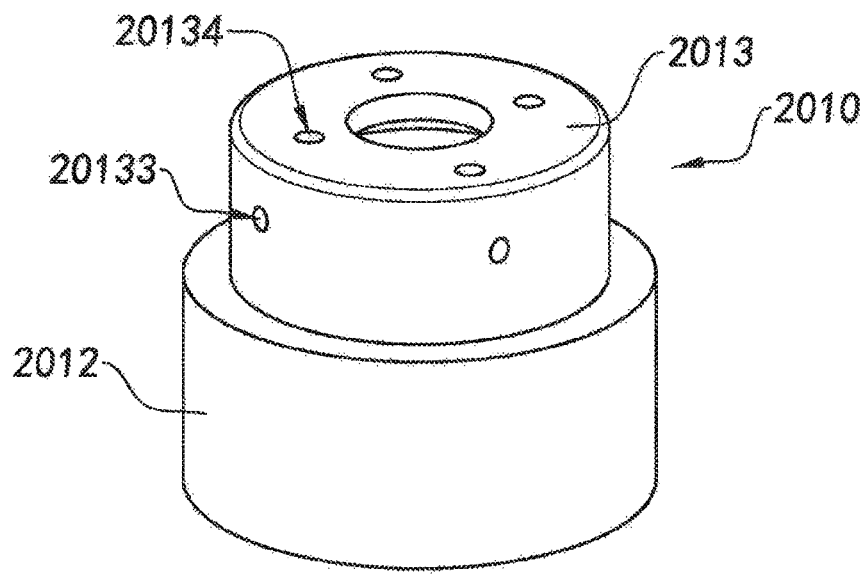
FIG. 11A is a schematic three-dimensional structure diagram of an adjustable optical lens assembly integrating a focusing mechanism according to a second preferred embodiment of the present disclosure.
Figure 11B:
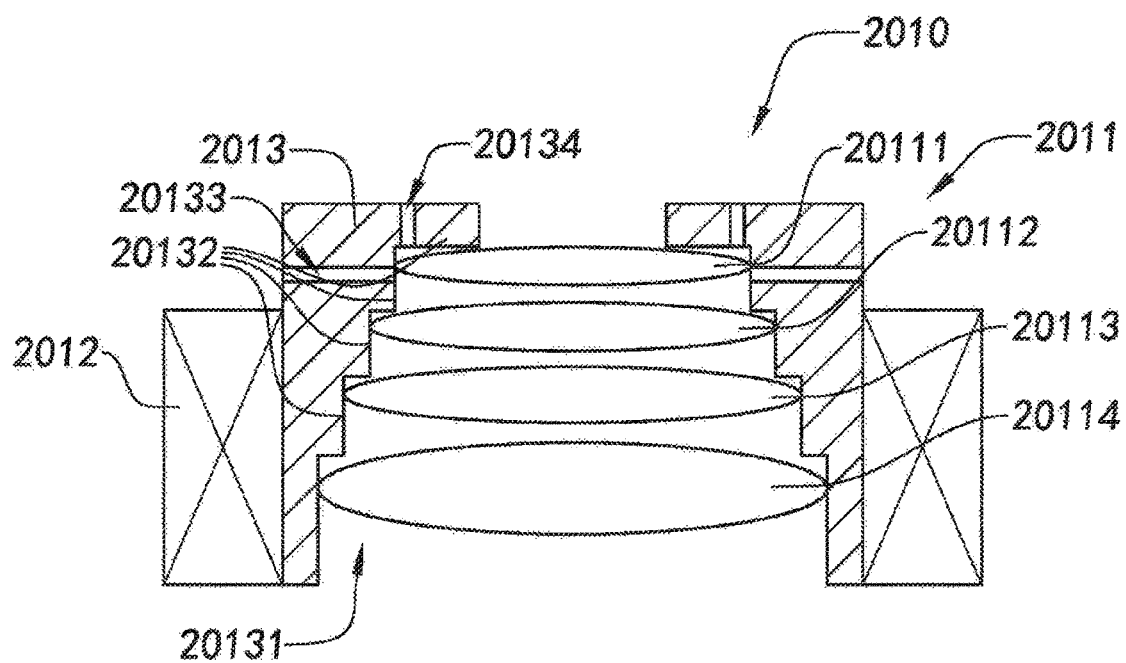
FIG. 11B is a schematic cross-sectional diagram of the adjustable optical lens assembly integrating a focusing mechanism according to the above second preferred embodiment of the present disclosure.
Figure 12:
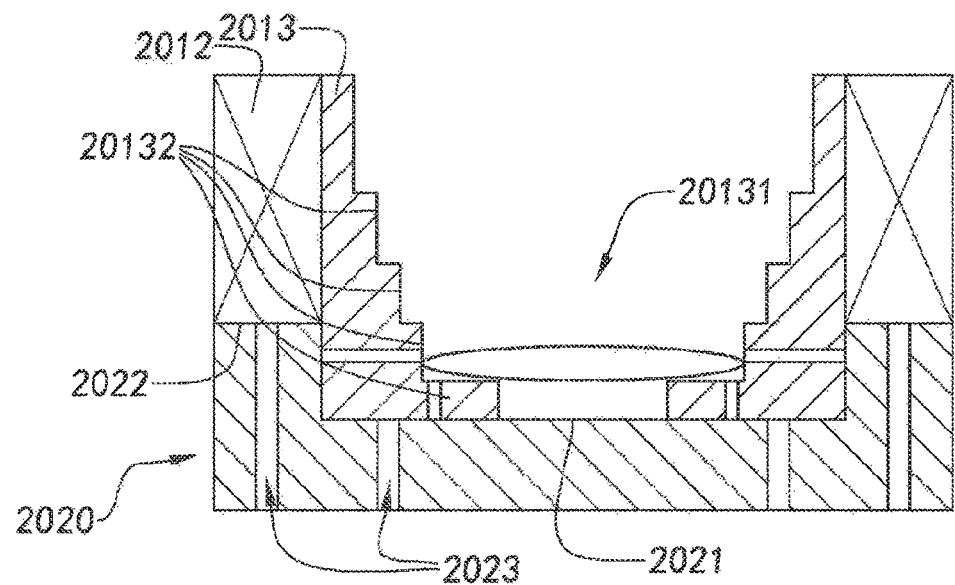
FIGS. 12-13 are schematic diagrams of a method for assembling the adjustable optical lens assembly integrating a focusing mechanism according to the above second preferred embodiment of the present disclosure.
Figure 13:
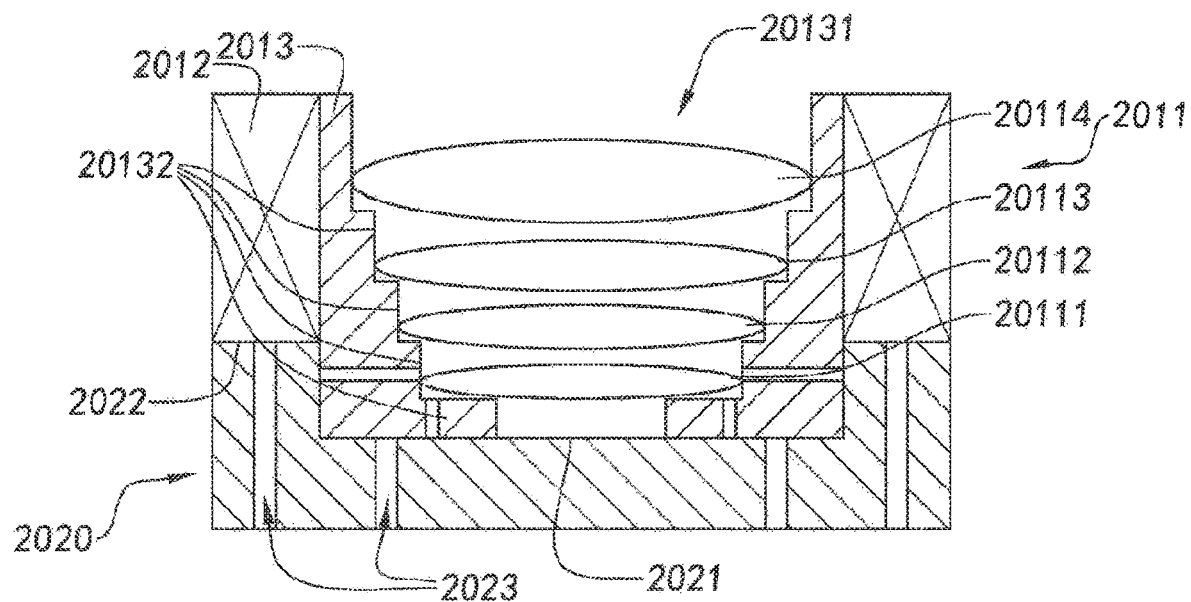

With reference to FIGS. 11A and 11B, the adjustable optical lens integrating a focusing mechanism in the present preferred embodiment will be described. As shown in FIG. 11A and FIG. 11B, an adjustable optical lens assembly 2010 includes at least one optical lens 2011, a focusing mechanism 2012, and a bearing structure 2013. The optical lenses 2011 are mounted in an accommodating cavity 20131 of the bearing structure 2013 along the height direction of the bearing structure 2013. The bearing structure 2013 holds the optical lenses 2011, and the bearing structure 2013 is mounted inside the focusing mechanism 2012, moves as the focusing mechanism 2012 is powered on, drives the optical lenses 2011 to move, and thus is suitable for focusing.

In the preferred embodiment, there are four optical lenses 2011, i.e., a first optical lens 20111, a second optical lens 20112, a third optical lens 20113, and a fourth optical lens 20114. At least one of the optical lenses 2011 is pre-assembled in the bearing structure 2013, and the assembly position of the pre-assembled optical lens 2011 in the bearing structure 2013 is adjustable, so that the optical center of the optical lens assembly can be adjusted.

In the present disclosure, the pre-assembled optical lens 2011 is referred to as an adjustable lens, and a lens assembly including the adjustable lens is referred to as an adjustable optical lens assembly. In the present preferred embodiment, the first optical lens 2011 is pre-assembled in the internal space of the bearing structure 2013, that is, the first optical lens 2011 is the adjustable lens in the present preferred embodiment. The assembly position of the adjustable lens in the bearing structure 2013 is suitable for being adjusted in at least one direction. For example, the adjustable direction may be one or more of the horizontal direction, the vertical direction, the oblique direction, and the circumferential direction.

The bearing structure 2013 includes fixing portions 20132 whose number is equal to the number of the optical lenses 2011, and the fixing portions 20132 extend from the inner wall of the bearing structure 2013 toward the accommodating cavity 20131 to form a boss to hold the optical lenses 2011, i.e., each of the optical lenses 2011 is suitable for being placed in the corresponding fixing portion 20132. Such arrangement, when the bearing structure 2013 is inverted to assemble each of the optical lenses 2011, facilitates the placement of the optical lenses 2011 on the fixing portions 20132, and adhesive dispensing or welding, which is advantageous for the assembly and fixing.

The bearing structure 2013 has at least one adjustment channel 20133. The adjustment channel 20133 connects the internal space of the bearing structure 2013 with the external environment, and the outer wall of the adjustable lens corresponds to the adjustment channel 20133 to adjust the adjustable lens from the outside of the bearing structure 2013 through the adjustment channel 20133 so as to adjust the center axis of the adjustable lens. Such arrangement, when the bearing structure 2013 is inverted to assemble each of the optical lenses 2011, facilitates adjusting the adjustable lens such that the center axis of the adjustable optical lens assembly coincides with the center axis of the photosensitive chip or is within an allowable range of deviation, so as to ensure the image quality of the camera module.

In the present preferred embodiment, four adjustment channels 20133 are disposed along the outer wall of the bearing structure 2013. The angle between every two adjacent ones of the four adjustment channels 20133 is 90 degrees, and each of the four adjustment channels corresponds to the adjustable lens.

The bearing structure 2013 further has at least one fixing channel 20134. The fixing channel 20134 is disposed on the top of the bearing structure 2013 to connect the external environment of the bearing structure 2013 with the adjustable lens. The fixing channel 20134 corresponds to the position of the adjustable lens, and preferably corresponds to the edge of the adjustable lens, to facilitate the injection of glue through the fixing channel 20134 to fix the adjustable lens to the inner wall of the bearing structure 2013.

In an implementation of the present preferred embodiment, there are four fixing channels 20134. The top of each fixing channel 20134 is disposed on the top of the bearing structure 2013, and the bottom of each fixing channel 20134 is connected with the adjustable lens. After the glue is injected from the top of the fixing channel 20134 to the bottom of the fixing channel 2013 and is cured, the glue can connect the adjustable lens and the bearing structure 2013.

It is worth mentioning that the bearing structure 2013 has the functions of the lens barrel and the motor holder in the conventional lens assembly module. In the present disclosure, the bearing structure 2013 is used as the lens barrel and the holder of the focusing mechanism. The bearing structure 2013 can move inside the focusing mechanism 2012, can also hold the optical lens 2011, and is suitable to be made of an opaque material, which can prevent external stray lights from entering the adjustable optical lens assembly 2010 from a place other than an incident hole.

The bearing structure 2013 may be implemented in the following three methods: (1) when designed for the focusing mechanism 2012, besides the holder function, the holder is further made to function as a lens barrel, which conforms to the size of a lens barrel and can be used to hold a lens; (2) when designed for the lens barrel, besides holding the lens, the holder functions as a holder of the focusing mechanism, to be further mounted in the focusing mechanism to function as the holder of the focusing mechanism; (3) the lens barrel and the holder of the focusing mechanism are fabricated as an assembly. In short, the above fabrication methods are merely used as examples. Those skilled in the art may understand that whether the lens barrel is used as the holder of the focusing mechanism or the holder of the focusing mechanism is used as the lens barrel, the fabrication method of the bearing structure 2013 may also be implemented in other methods, as long as the bearing structure 2013 has the functions of the lens barrel and the holder of the focusing mechanism in the conventional lens assembly module.

The focusing mechanism 2012 is suitable for implementation as a voice coil motor (VCM), a piezoelectric ceramic motor, a liquid crystal motor, and the like.

Referring to FIG. 12, FIG. 13, FIG. 6 and FIG. 18, the method for assembling the adjustable optical lens assembly 2010 and a jig 2020 for assisting the assembly of the present preferred embodiment will be described. The jig 2020 matches the shape and size of the adjustable optical lens assembly 2010.

The jig 2020 includes a first bearing portion 2021 and a second bearing portion 2022, and has at least two air channels 2023. The second bearing portion 2022 is disposed at the periphery of the first bearing portion 2021, and the top end surface of the second bearing portion 2022 is higher than the bottom end surface of the first bearing portion 2021. A groove is formed at the first bearing portion 2021. In the adjustable optical lens assembly 2010, the top end surface of the bearing structure 2013 is higher than the top end surface of the focusing mechanism 2012, and the groove between the first bearing portion 2021 and the second bearing portion 2022 of the jig 2020 can accommodate the portion of the bearing structure 2013 higher than the focusing mechanism 2012. In other words, the first bearing portion 2021 matches the shape and size of the bearing structure 2013, and the second bearing portion 2022 matches the shape and size of the focusing mechanism 2012. When the adjustable optical lens assembly 2010 is assembled, the focusing mechanism 2012 is inversely disposed on the second bearing portion 2022, and the bearing structure 2013 is inversely disposed on the first bearing portion 2021. In the assembly process, the first bearing portion 2021 and the second bearing portion 2022 are respectively used for holding the bearing structure 2013 and the focusing mechanism 2012.

Further, the air channels 2023 penetrate through the top and the bottom of the jig 2020 such that the external environment of the top of the jig 2020 and the external environment of the bottom of the jig are connected through the air channels 2023. At least one of the air channels 2023 is disposed on the first bearing portion 2021, and at least one of the air channels 2023 is disposed on the second bearing portion 2022, to facilitate placing a suction nozzle or other vacuum device on the bottom of the jig 2020 to apply an external force to the bearing structure 2013 and the focusing mechanism 2012 through the air channels 2023, to fix the bearing structure 2013 and the focusing mechanism 2012 to the first bearing portion 2021 and the second bearing portion 2022 respectively, facilitating the assembly in a subsequent process.

In the present preferred embodiment, four air channels 2023 are evenly disposed at each of the first bearing portion 2021 and the second bearing portion 2022 at intervals so as to fix the bearing structure 2013 and the focusing mechanism 2012 from all directions, to achieve a firmer fixation.

An assembly method 20900 of the adjustable optical lens assembly 2010 includes the following steps:

step (20901): inversely disposing the focusing mechanism 2012 and the bearing structure 2013 on the jig 2020;

step (20902): adjusting the jig 2020, and fixing the focusing mechanism 2012 and the bearing structure 2013 on the jig 2020;

step (20903): assembling sequentially the optical lenses 2011 in an internal space of the bearing structure 2013, where at least one optical lens 2011 serves as an adjustable lens, and an assembly position of the optical lens is adjustable;

step (20904): fixing optical lenses 2011 other than the adjustable lens; and step (20905): removing the adjustable optical lens assembly 2010 from the jig 2020, and completing an assembly of the adjustable optical lens assembly 2010.

In the step (20901), since the bearing structure 2013 has been designed to have dual functions of the lens barrel and the holder of the focusing mechanism when it is designed, the focusing mechanism 2012 and the bearing structure 2013 may be assembled in one of the following three methods: (a) the focusing mechanism 2012 may be connected to the bearing structure 2013 in advance so that the bearing structure 2013 has the function of the holder of the focusing mechanism 2012, and the two as a whole are inversely disposed on the jig 2020 such that the bearing structure has the function of the lens barrel; (b) the focusing mechanism 2012 and the bearing structure 2013 are inversely disposed on the matched jig 2020 respectively, then the assembly of the two is performed; (c) after assembling the optical lenses 2011 inside the bearing structure 2013, the bearing structure 2013 has the function of the lens barrel, and the bearing structure 2013 is assembled with the optical lenses 2011 as a whole, the bearing structure 2013 and the focusing mechanism 2012 are assembled such that the bearing structure has the function of the holder of the focusing mechanism 2012.

In the step (20902), by adjusting the jig 2020 to be matched with a suction nozzle or a vacuum device, the suction nozzle or the vacuum device applies a pressure the air channels 2023 at the bottom of the jig 2020 so that adsorption can be performed through the air channels 2023 to fix the focusing mechanism 2012 and the bearing structure 2013, and the focusing mechanism 2012 and the bearing structure 2013 are respectively fixed to the second bearing portion 2022 and the first bearing portion 2021 of the jig 2020, avoiding sliding, shaking, and offsetting in a subsequent assembly process, thereby reducing the assembly deviation and ensuring the assembly precision.

In the step (20903) and the step (20904), the optical lenses 2011, such as the four optical lenses 2011 in the present preferred embodiment, are placed. In present preferred embodiment, the four optical lens 2011, i.e., the first optical lens 20111, the second optical lens 20112, the third optical lens 20113, and the fourth optical lens 20114 are sequentially placed one by one. The first optical lens 20111 serves as an adjustable lens and is pre-assembled in the bearing structure 2013. Therefore, the first optical lens 20111 is not fixed so that the adjustment can be performed in a subsequent process. A mixed adhesive of the thermosetting adhesive and the UV adhesive may be semi-cured under ultraviolet lights to pre-assemble the first optical lens 20111 in the bearing structure 2013 and may still be adjusted in a subsequent process. A baking treatment may be directly performed on the first optical lens 20111 after the adjustment such that the glue used in the pre-assembly is completely cured to achieve the fixation of the first optical lens 20111. After placed, it is suitable for directly placing the second optical lens 20112, the third optical lens 20113, and the fourth optical lens 20114 by the thermosetting adhesive. The optical lens may be fixed each time one optical lens is placed, or the optical lenses may be fixed after all optical lenses are placed, depending on the actual situation. Those skilled in the art may understand that the assembly method of the optical lenses 2011 may be selected according to the structure of the inner wall of the bearing structure 2013, and any one or more of the four optical lenses 2011 may be pre-assembled as an adjustable lens. Here. the pre-assembled adjustable lens has to be assembled in a portion of the bearing structure 2013 higher than the focusing mechanism to facilitate adjusting from the outside.

It is worth mentioning that after the lenses other than the adjustable lens are fixed, that is, the second optical lens 20112, the third optical lens 20113, and the fourth optical lens 20114 are assembled, the lenses may be fixed by adopting an adhesive dispensing method using the thermosetting adhesive. When the adjustable optical lens assembly 2010 is mounted on a camera module, the adjustable lens, i.e., the first optical lens 20111 in the preferred embodiment is adjusted, so that after the center axis of the adjustable optical lens assembly 2010 coincides with the center axis of the photosensitive chip in the camera module or is within an allowable range of deviation, the adjustment of the adjustable lens meets the requirements, and then the adjustable lens is fixed.

In the step (20905), the suction nozzle or other vacuum device is removed, the adjustable optical lens assembly 2010 is taken out from the jig 2020, and the assembly of the adjustable optical lens assembly 2010 is completed. Here, the adjustable optical lens assembly 2010 may be taken out by injecting air through the air channels 2023. By exerting an opposite force on the adjustable optical lens assembly 2010, the adjustable optical lens assembly 2010 is pushed out, and then taken out. Other methods may also be adopted to take out the adjustable optical lens assembly 2010 according to the actual situation.

Figure 14:
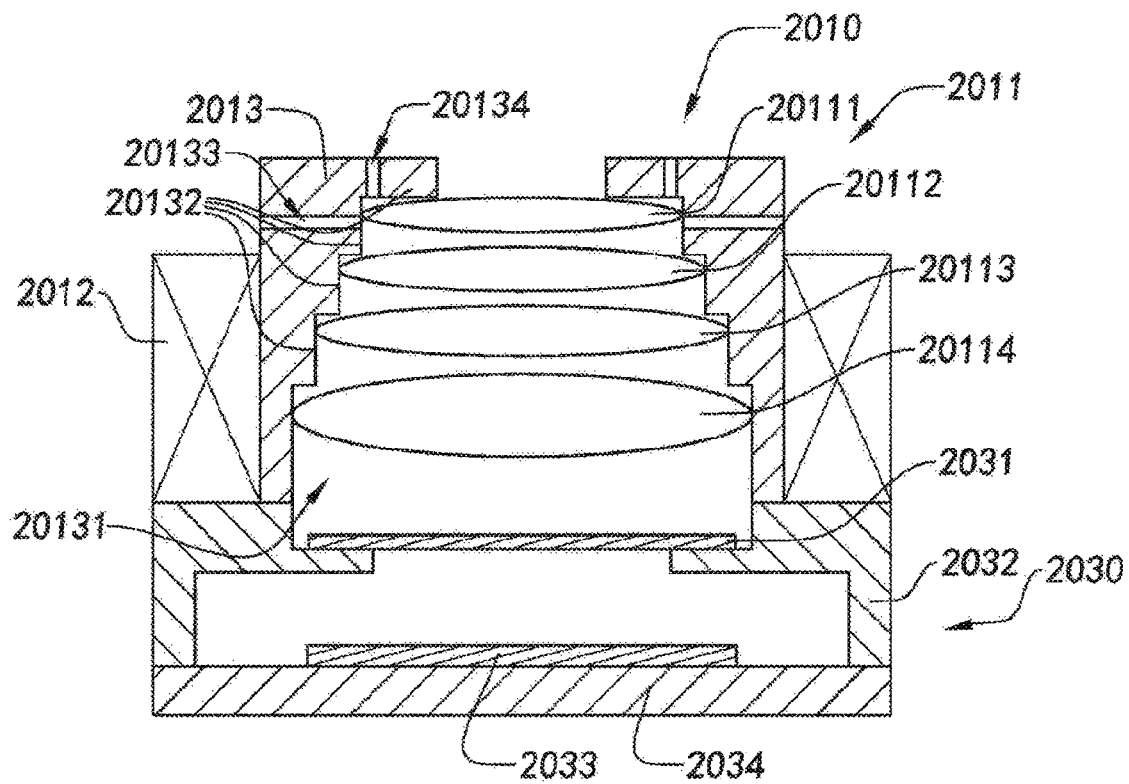
FIG. 14 is a schematic cross-sectional diagram of a camera module including the adjustable optical lens assembly integrating a focusing mechanism according to the above second preferred embodiment of the present disclosure.

Referring to FIG. 14, a camera module including the adjustable optical lens assembly 2010 in the above preferred embodiment will be described. As shown in FIG. 14, a camera module includes the adjustable optical lens assembly 2010 and a photosensitive device 2030. The photosensitive device 2030 includes an optical filter 2031, a lens holder 2032, a photosensitive chip 2033, and a circuit board 2034. The photosensitive device 2030 is manufactured by a COB (chip on board) process. The optical filter 2031 is mounted inside the upper portion the lens holder 2032, connected to the lens holder 2032 and located above the photosensitive chip 2033. The photosensitive chip 2033 is mounted on the circuit board 2034, and separates from the inner wall of the lens holder 2032. The circuit board 2034 is mounted on the bottom of the lens holder 2032 and allows the photosensitive chip 2033 to be mounted in the cavity inside the lens holder 2032. The adjustable optical lens assembly 2010 is mounted on the top of the photosensitive device 2030 and located on the photosensitive path of the photosensitive chip 2033. Lights reflected by an object pass through the adjustable optical lens assembly 2010, enter into the camera module, and are received by the photosensitive chip 2033 for photoelectric conversion, so that an object-related image can be obtained in the camera module subsequently.

Further, the focusing mechanism 2012 and the bearing structure 2013 are both fixedly assembled on the top of the lens holder 2032 and are connected with the lens holder 2032, so that each of the optical lenses 2011 is located on the photosensitive path of the photosensitive chip 2033, which facilitates subsequent imaging, and enables the camera module to operate more stably and reliable.

Figure 19:
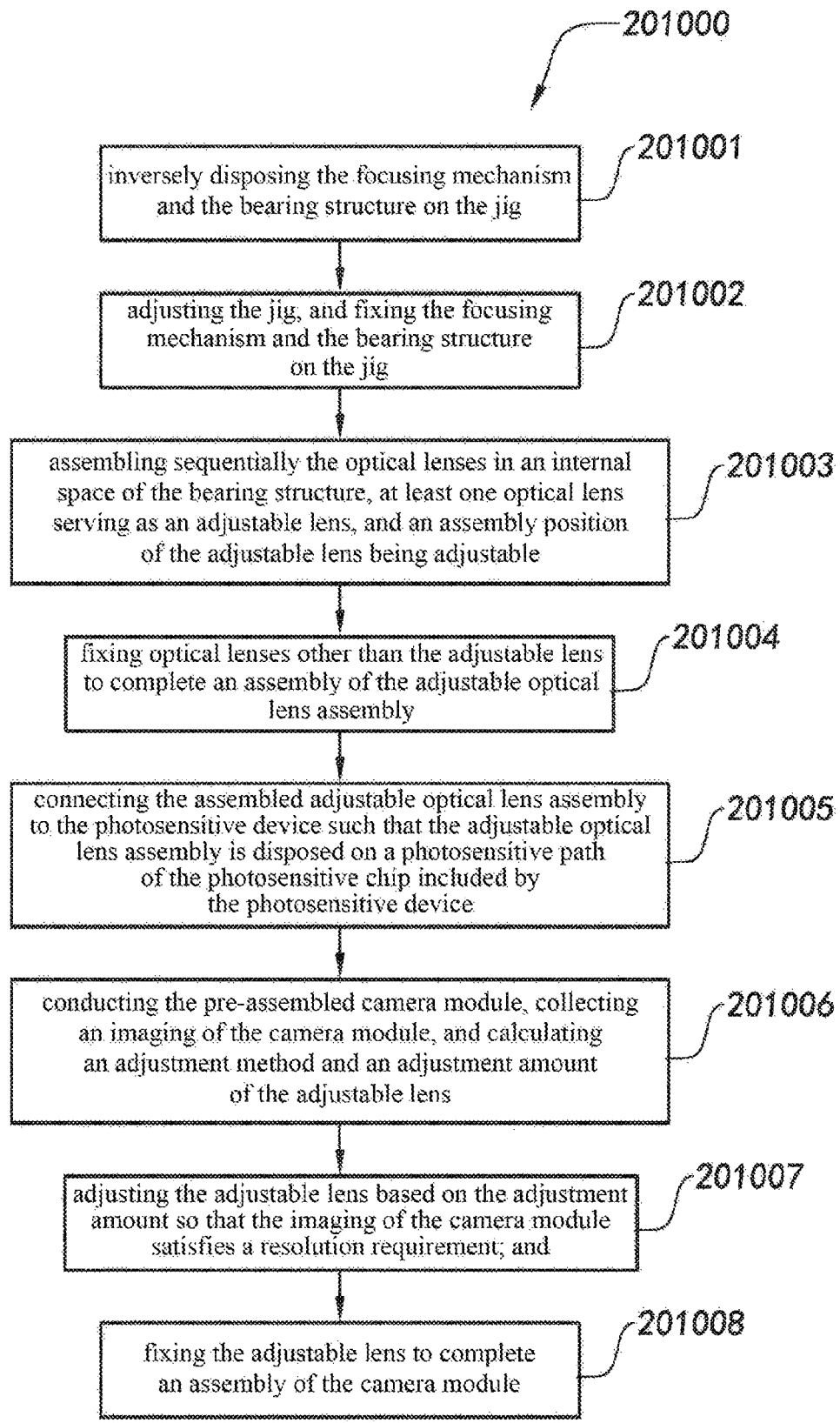
FIG. 19 is a flowchart of a method for assembling the camera module including the adjustable optical lens assembly integrating a focusing mechanism according to the above preferred embodiment of the present disclosure.

Referring to FIG. 19, the assembling method 201000 of the camera module includes the following steps:

step (201001): inversely disposing the focusing mechanism 2012 and the bearing structure 2013 on the jig 2020;

step (201002): adjusting the jig 2020, and fixing the focusing mechanism 2012 and the bearing structure 2013 on the jig 2020;

step (201003): placing sequentially the optical lenses 2011 in an internal space of the bearing structure 2013, where a first optical lenses 20111 serves as an adjustable lens, and an assembly position of the adjustable lens is adjustable;

step (201004): fixing optical lenses 2011 other than the adjustable lens to complete an assembly of the adjustable optical lens assembly 2020;

step (201005): connecting the assembled adjustable optical lens assembly 2010 to the photosensitive device 2030 such that the adjustable optical lens assembly 2010 is disposed on a photosensitive path of the photosensitive chip 2033;

step (201006): electrically conducting a pre-assembled camera module, collecting an imaging of the camera module, and calculating an adjustment method and an adjustment amount of the adjustable lens;

step (201007): adjusting the adjustable lens according to the adjustment amount so that the imaging of the camera module satisfies a resolution requirement; and step (201008): fixing the adjustable lens to complete an assembly of the camera module.

The steps (201001)-(201004) described above are the same as the assembly of the adjustable optical lens assembly 2010, and detailed descriptions thereof will be omitted.

In the step (201005), the bearing structure 2013 and the focusing mechanism 2012 are both mounted on the top of the lens holder 2032, and are fixedly connected with the lens holder 2032.

In the step (201006), the adjustment method and the adjustment amount of the adjustable lens are calculated using software, so that the adjustable lens is quantitatively and objectively adjusted. After the adjustment, the center axis of the adjustable optical lens assembly 2010 coincides with the center axis of the photosensitive chip 2033 or is within an allowable range of deviation, so that the imaging of the camera module satisfies the resolution requirements.

In the step (201008), the adjustable lens is fixed by injecting glue through the adjustment channel 20133 or the fixing channel 20134, or fixed by completely curing the glue used in the pre-assembled of the adjustable lens. Thus, one of the following method may be used: (1) injecting glue into the adjustment channel 20133 and baking for curing the glue for pre-assembling the adjustable lens and the glue injected in the adjustment channel 20133, so that the adjustable lens is fixed and the adjustment channel is sealed; (2) injecting glue through the fixing channel 20134 to be touched by the adjustable lens, and curing the glue injected through the fixing channel 20134 and the glue for pre-assembling the adjustable lens, to simultaneously fix the adjustable lens and the fixing channel 20134; (3) injecting glue through the adjustment channel 20133 and the fixing channel 20134 simultaneously, and curing the injected glue to fix the adjustable lens; (4) when the adjustable lens is placed on the fixing portion 20132 and the glue is used for semi-curing, the baking may be directly performed, to completely cure the glue for pre-assembling, to fix the adjustable lens.

Figure 15:
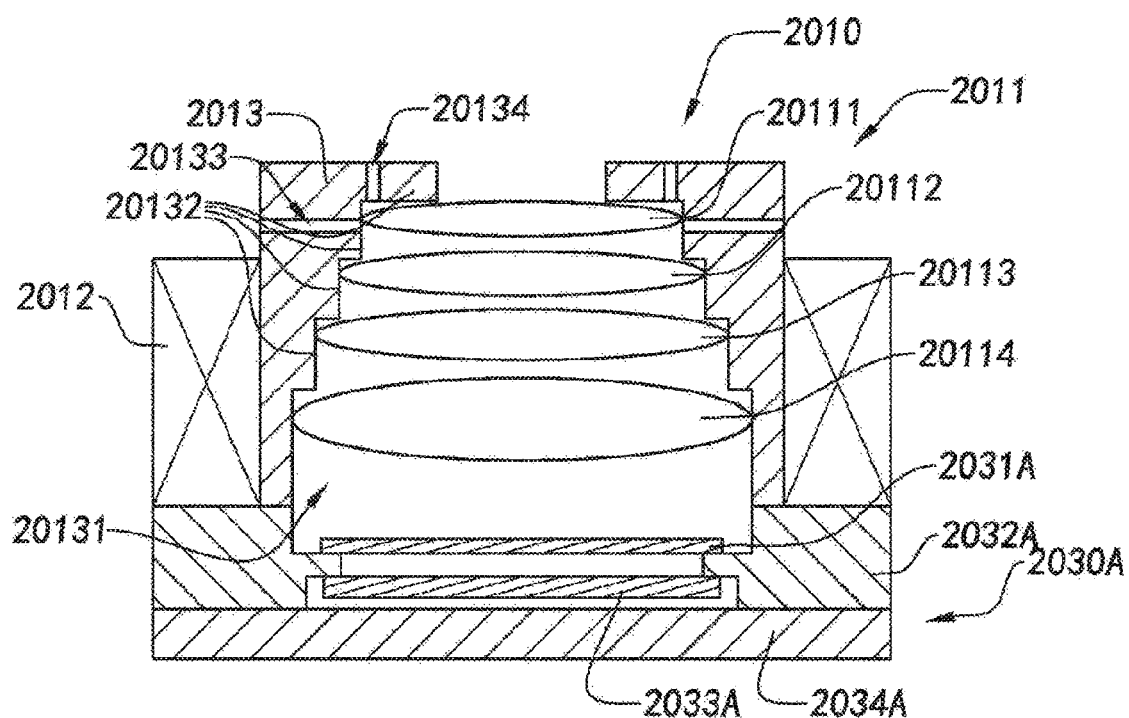
FIG. 15 is a modified embodiment of the camera module according to the above second preferred embodiment of the present disclosure.

Referring to FIG. 15, an embodiment of a camera module including the adjustable optical lens assembly 2010 in the above preferred embodiment will be described. As shown in FIG. 15, a camera module includes the adjustable optical lens assembly 2010 and a photosensitive device 2030A. The photosensitive device 2030A includes an optical filter 2031A, a lens holder 2032A, a photosensitive chip 2033A, and a circuit board 2034A. The photosensitive device 2030A is manufactured by a COB (chip on board) process. The optical filter 2031A is mounted inside the upper portion of the lens holder 2032A and is connected to the lens holder 2032A. The photosensitive chip 2033A is mounted below the optical filter 2031A and separates from the optical filter 2031A. The photosensitive chip 2033A is directly connected to the lens holder 2032A, and separates from the circuit board 2034A mounted at the bottom of the lens holder 2032A. The lens holder 2032A has an electrical function, and a corresponding electrical element is implanted inside the lens holder 2032A, which ensures the imaging of the camera module and a thinner and more compact photosensitive device 2030A. As a result, the size of the camera module is smaller.

The adjustable optical lens assembly 2010 is mounted on the top of the photosensitive device 2030A and located on the photosensitive path of the photosensitive chip 2033A. Lights reflected by an object pass through the adjustable optical lens assembly 2010 and enter into the camera module, and are received by the photosensitive chip 2033A for a photoelectric conversion, so that an object-related image can be obtained by the camera module subsequently.

Further, the focusing mechanism 2012 and the bearing structure 2013 are both fixedly assembled on the top of the lens holder 2032A and are connected with the lens holder 2032A, so that each of the optical lenses 2011 is located on the photosensitive path of the photosensitive chip 2033A, which facilitates subsequent imaging, and enables the camera module to operate more stably and reliably.

Figure 16:
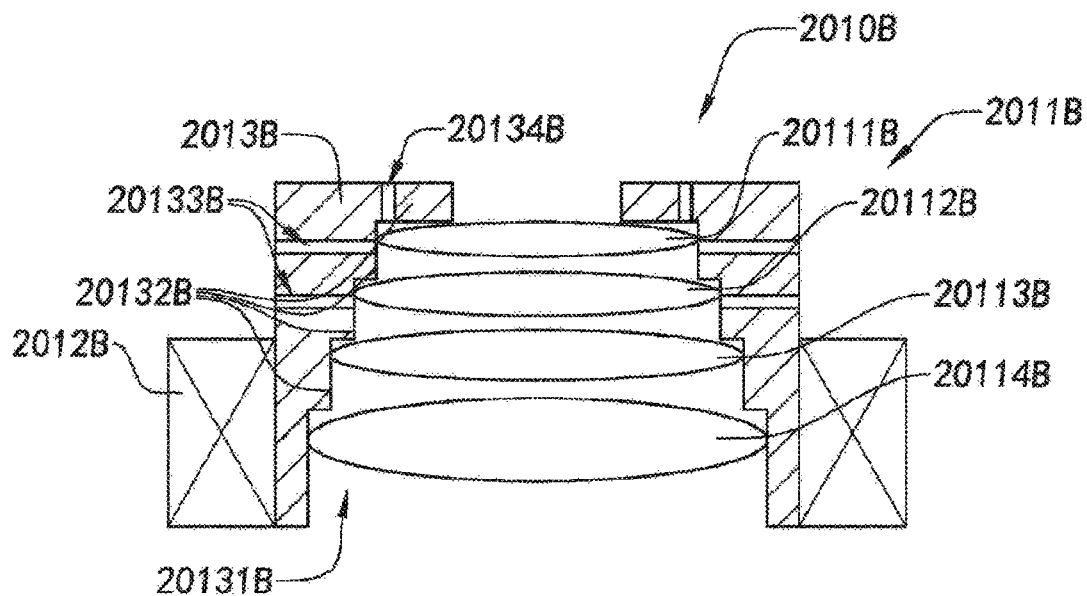
FIG. 16 is a schematic cross-sectional diagram of an adjustable optical lens assembly integrating a focusing mechanism according to a third preferred embodiment of the present disclosure.

With reference to FIG. 16, a second specific embodiment of the adjustable optical lens assembly of the present disclosure will be described. As shown in FIG. 16, an adjustable optical lens assembly 2010B includes at least two optical lenses 2011B, a focusing mechanism 2012B, and a bearing structure 2013B. The optical lenses 2011B are disposed in an internal space of the bearing structure 2013B along the height direction of the bearing structure 2013B. The assembly position of the at least two optical lenses 2011B in the bearing structure 2013B may be adjusted. The bearing structure 2013B is mounted inside the focusing mechanism 2012B, connects other elements of the focusing mechanism 2012B, and moves as the focusing mechanism 2012B is powered on, which is suitable for focusing.

The bearing structure 2013B has the functions of the lens barrel and the holder of the focusing mechanism of a conventional lens assembly, and can be used to hold each of the optical lenses 2011B, and functions as the holder of the focusing mechanism 2012B, and moves as the focusing mechanism 2012B is powered on, resulting in a smaller lens assembly size, easier assembly, and higher image quality.

In the present preferred embodiment, there are four optical lenses 2011B, i.e., a first optical lens 20111B, a second optical lens 20112B, a third optical lens 20113B, and a fourth optical lens 20114B. The first optical lens 20111B and the second optical lens 20112B are pre-assembled in the bearing structure 2013B, and an assembly position thereof is suitable for being adjusted in at least one direction, that is, in the present preferred embodiment, the first optical lens 20111B and the second optical lens 20112B are adjustable lenses.

The bearing structure 2013B includes fixing portions 20132B whose number is equal to the number of the optical lenses 2011B, and the fixing portions 20132B extend from the inner wall of the bearing structure 2013B toward the accommodating cavity 20131B to form a boss to hold the optical lenses 2011B, i.e., each of the optical lenses 2011B is suitable for being placed in the corresponding fixing portion 20132B. Such arrangement, when the bearing structure 2013B is inverted to assemble each of the optical lenses 2011B, facilitates the placement of the optical lenses 2011B on the fixing portions 20132B, and adhesive dispensing or welding, which is advantageous for the assembly and fixing.

The bearing structure 2013B has at least two adjustment channels 20133B. The adjustment channels 20133B connects the internal space of the bearing structure 2013B with the external environment, and each of outer walls of the adjustable lenses corresponds to at least one of the adjustment channels 20133B to adjust the adjustable lenses from the outside of the bearing structure 2013B through the adjustment channels 20133B so as to further adjust the center axes of the adjustable lenses.

In the present preferred embodiment, eight adjustment channels 20133B are provided along the outer wall of the bearing structure 2013B, and each group has four channels. Each group has a circular distribution along the bearing structure 2013B. One group corresponds to the first optical lens 20111B, and the other group corresponds to the second optical lens 20112B. The angle between every two adjacent adjustment channels 20133B in each group is 90°, and each adjustment channel corresponds to a respective adjustable lens.

When the adjustable optical lens assembly 2010B is assembled, the first optical lens 20111B and the second optical lens 20112B are mounted in the bearing structure 2013B, and are not completely fixed to it, so that they are suitable for being adjusted. The third optical lens 20113B and the fourth optical lens 20114B are fixed.

After adjusting the first optical lens 20111B and the second optical lens 20112B, and the center axis of the adjustable optical lens assembly 2010B meets requirements, the first optical lens 20111B and the second optical lens 20112B are fixed, and the following methods may be used for fixing: (1) if the first optical lens 20111B and the second optical lens 20112B are pre-assembled by using a thermosetting adhesive and a UV adhesive for semi-curing under ultraviolet lights, they may be directly baked after adjustment to completely cure the glue used in the pre-assembly, to achieve the fixation of the first optical lens 20111B and the second optical lens 20112B; (2) if the first optical lens 20111B and the second optical lens 20112B are pre-assembled by using a thermosetting adhesive and a UV adhesive for semi-curing under ultraviolet lights, glue such as the thermosetting adhesive may be injected through the adjusting channel 20133B after the adjustment, and baking is performed to completely cure the glue used in the pre-assembly and the glue injected through the adjusting channel 20133B, so as to fix the first optical lens 20111B and the second optical lens 20112B, and simultaneously seal the adjustment channels 20133B; (3) if the first optical lens 20111B and the second optical lens 20112B are pre-assembled in other methods, after being adjusted, the first optical lens 20111B and the second optical lens 20112B may be fixed by injecting glue through the adjustment channels 20133B, and the adjustment channels 20133B are sealed at the same time; and (4) a fixing channel may alternatively be disposed on the top of the bearing structure 2013B to inject glue to fix the first optical lens 20111B, and glue may be injected through the adjusting channels 20133B to fix the second optical lens 20112B.

Figure 17:
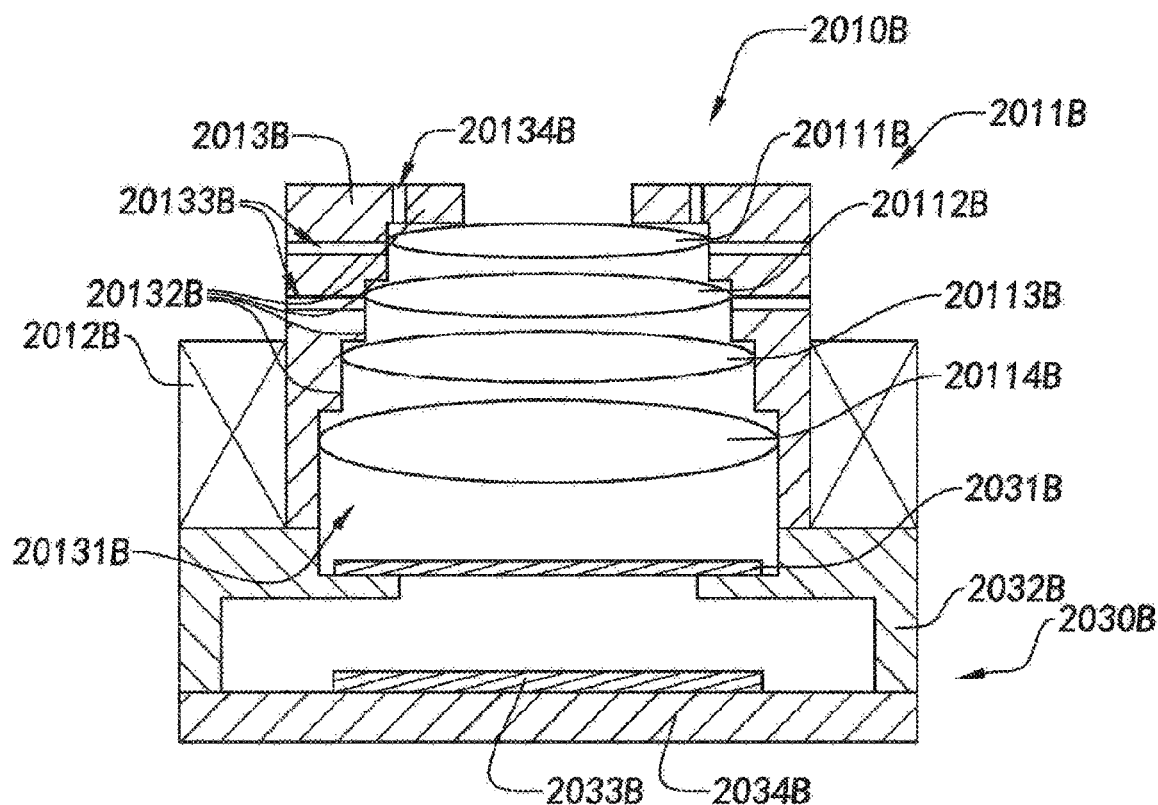
FIG. 17 is a schematic cross-sectional diagram of a camera module including the adjustable optical lens assembly integrating a focusing mechanism according to the above third preferred embodiment of the present disclosure.
Figure 18:
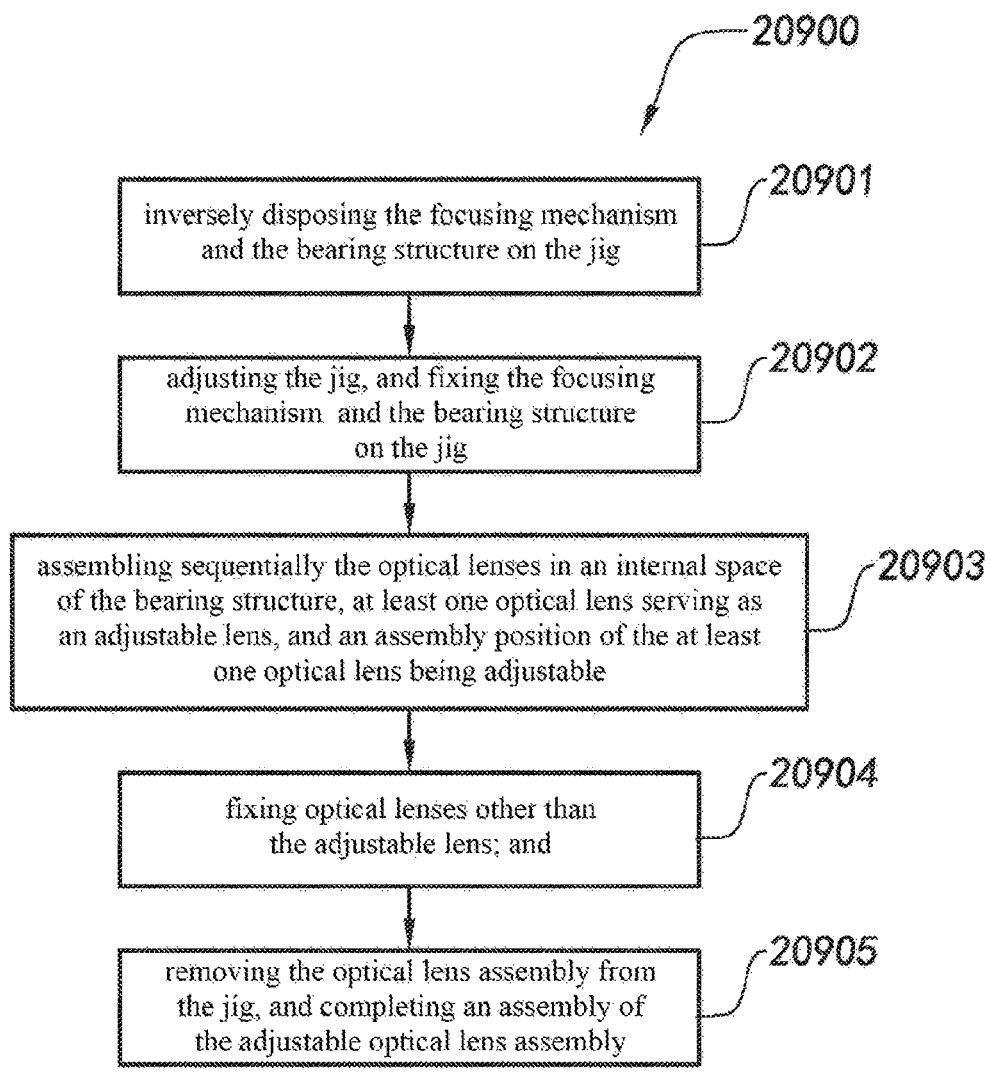
FIG. 18 is a flowchart of a method for assembling the adjustable optical lens assembly integrating a focusing mechanism according to the above preferred embodiment of the present disclosure.

Referring to FIG. 17, a camera module including the adjustable optical lens assembly 2010B in the above preferred embodiment will be described. As shown in FIG. 17, a camera module includes the adjustable optical lens assembly 2010B and a photosensitive device 2030B. The photosensitive device 2030B includes an optical filter 2031B, a lens holder 2032B, a photosensitive chip 2033B, and a circuit board 2034B. The photosensitive device 2030B is manufactured by a COB (chip on board) process. The optical filter 2031B is mounted inside the upper portion of the lens holder 2032B and is connected to the lens holder 2032B and located above the photosensitive chip 2033B. The photosensitive chip 2033B is mounted on the circuit board 2034B, and separates from the inner wall of the lens holder 2032B. The circuit board 2034B is mounted on the bottom of the lens holder 2032B and allows the photosensitive chip 2033B to be mounted in the cavity inside the lens holder 2032B. The adjustable optical lens assembly 2010B is mounted on the top of the photosensitive device 2030B and located on the photosensitive path of the photosensitive chip 2033B. Lights reflected by an object pass through the adjustable optical lens assembly 2010B and enter into the camera module, and are received by the photosensitive chip 2033B for photoelectric conversion, so that an object-related image can be obtained by the camera module subsequently.

Further, the focusing mechanism 2012B and the bearing structure 2013B are both fixedly assembled on the top of the lens holder 2032B and are connected with the lens holder 2032B, so that each of the optical lenses 2011B is located on the photosensitive path of the photosensitive chip 2033B, which facilitates subsequent imaging, and enables the camera module to operate more stably and reliably.

In the present disclosure, by improving the lens barrel and the holder of the focusing mechanism, the lens barrel fixing the lens assembly and the holder of the focusing mechanism are designed as a whole to reduce the assembly process, reduce the manufacturing cost, and improve the image quality, and at least one lens assembly is pre-assembled. In the subsequent process, the assembly position of the lens assembly is adjusted to obtain an adjustable split lens assembly, so that the image quality of the camera module in the assembly process may be timely adjusted with an objective, improving the manufacturing yield of the split lens assembly and the camera module.

Figure 20:
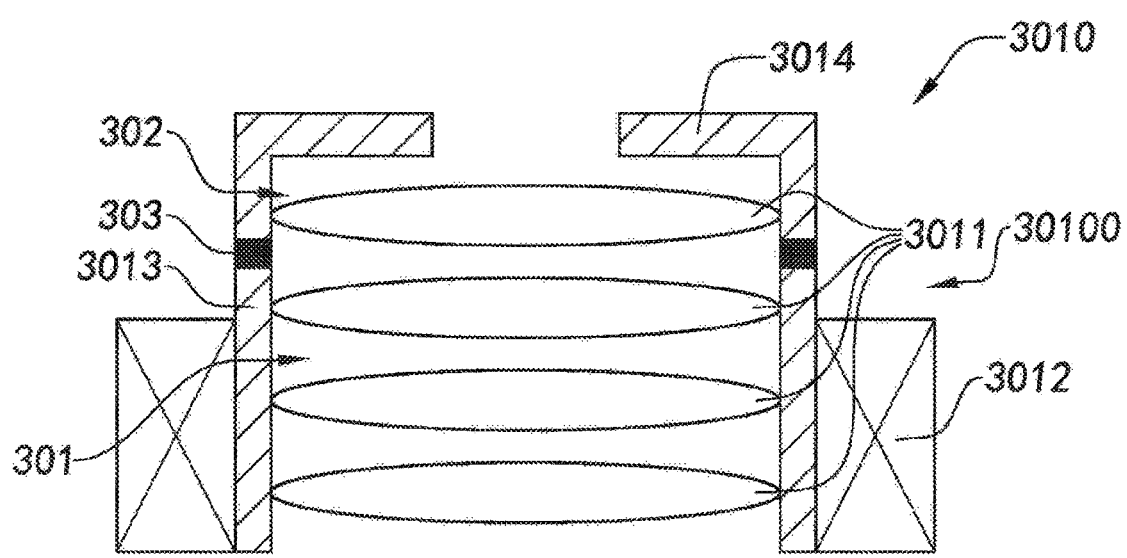
FIG. 20 is a schematic cross-sectional diagram of a split lens assembly module according to a fourth preferred embodiment of the present disclosure.

Referring to FIG. 20, a split lens assembly module provided by the present disclosure will be described. As shown in FIG. 20, a split lens assembly module 3010 includes a lens assembly 30100 and a focusing mechanism 3012. The lens assembly 30100 includes at least two optical lenses 3011, at least one lens barrel member 3014, and a bearing structure 3013. The optical lenses 3011 are respectively mounted in the bearing structure 3013 and the lens barrel member 3014 to form a fixing lens assembly 301 including the bearing structure 3013 and at least one to-be-adjusted lens assembly 302 including the lens barrel member 3014. The to-be-adjusted lens assembly 302 is pre-assembled in the fixing lens assembly 301, and the assembly position of the to-be-adjusted lens assembly 302 is suitable for being adjusted relative to the assembly position of the fixing lens assembly 301, so that the optical center of the split lens assembly module 3010 can be adjusted. The fixing lens assembly 301 is mounted inside the focusing mechanism 3012. The bearing structure 3013 serves as a holder of the focusing mechanism 3012, and moves as the focusing mechanism 3012 is powered on, to adjusts the focus.

The present preferred embodiment is illustrated by taking one fixing lens assembly 301 and one to-be-adjusted lens assembly 302 as an example. The fixing lens assembly 301 holds at least one optical lens 3011, and the to-be-adjusted lens assembly 302 holds at least one optical lens 3011. As can be seen from FIG. 20, in the present preferred embodiment, the fixing lens assembly 301 includes three optical lenses 3011. The three optical lenses 3011 are sequentially disposed in the internal space of the bearing structure 3013 along the height direction of the bearing structure 3013 and are fixed. The optical lenses 3011 and the bearing structure 3013 may be assembled and fixed by adhesive dispensing or welding or other implementable methods. In the present preferred embodiment, the optical lenses 3011 are fixed in the bearing structure 3013 using the thermosetting adhesive.

Further, besides serving as the lens barrel member of the fixing lens assembly 301 to hold each of the optical lenses 3011, the bearing structure 3013 serves as a holder of the focusing mechanism 3012, is mounted inside the focusing mechanism 3012, and is connected with other components of the focusing mechanism 3012. When the focusing mechanism 3012 is powered on, the bearing structure 3013 moves as the focusing mechanism 3012 is powered on, and moves along the height direction or other direction of the focusing mechanism 3012, which is suitable for focusing.

The to-be-adjusted lens assembly 302 includes one optical lens 3011. The optical lens 3011 is fixed in the internal space of the lens barrel member 3014. The optical lens 3011 may be assembled and fixed to the bearing structure 3013 by using adhesive dispensing or welding or other implementable methods. In the present preferred embodiment, the optical lens 3011 is fixed in the lens barrel member 3014 by using the thermosetting adhesive.

The to-be-adjusted lens assembly 302 is pre-assembled on the top of the fixing lens assembly 301 by glue 303, that is, the lens barrel member 3014 is connected to the bearing structure 3013 through the glue 303, thereby implementing the assembly of the to-be-adjusted lens assembly 302 and the fixing lens assembly 301. The assembly position of the to-be-adjusted lens assembly 302 is suitable for being adjusted in at least one direction, and the adjustable direction is suitable for being selected from one or more of the horizontal direction, the vertical direction, the oblique direction, and the circumferential direction.

It is worth mentioning that the glue 303 of the to-be-adjusted lens assembly 302 used in the pre-assembly is suitable for being selected from a thermosetting adhesive or a mixed adhesive of a UV adhesive and a thermosetting adhesive. The glue 303 of the present preferred embodiment uses the mixed adhesive of the UV adhesive and the thermosetting adhesive. After UV exposure, the glue 303 is semi-cured to achieve the pre-assembly. When the to-be-adjusted lens assembly 302 is adjusted later and needs to be fixed, the glue 303 is completely cured through a baking treatment to fix the entire split lens assembly module 3010.

It is more worth mentioning that the present preferred embodiment is only an example, and those skilled in the art may think of that multiple to-be-adjusted lens assemblies 2 are pre-assembled to form multiple adjustable to-be-adjusted lens assemblies. Alternatively, multiple lens assemblies may be fixed, and one or more of the fixed lens assemblies are used as the to-be-adjusted lens assemblies to adjust the optical center of the lens assembly in a subsequent process.

Referring to FIG. 21, FIG. 22, FIG. 6 and FIG. 27, the method for assembling the split lens assembly module 3010 and a jig 3020 used in the assembly process of the present disclosure will be described. The jig 3020 matches the shape and size of the split lens assembly module 3010, and is used for assisting the assembly of the split lens assembly module 3010.

As shown in FIG. 6, The jig 3020 includes a first bearing portion 3021 and a second bearing portion 3022, and has at least two air channels 3023. The second bearing portion 3022 is disposed at the periphery of the first bearing portion 3021, and the top end surface of the second bearing portion 3022 is higher than the bottom end surface of the first bearing portion 3021. A groove is formed between the first bearing portion 3021 and the second bearing portion 3022 and located at the first bearing portion 3021. Since in the split lens assembly module 3010, the top end surface of the bearing structure 3013 is higher than the top end surface of the focusing mechanism 3012, the groove between the first bearing portion 3021 and the second bearing portion 3022 of the jig 3020 can accommodate the portion of the bearing structure 3013 higher than the focusing mechanism 3012 and the lens barrel member 3014, in other words, the first bearing portion 3021 matches the shape and size of the bearing structure 3013 and the lens barrel member 3014. The second bearing portion 3022 matches the shape and size of the focusing mechanism 3012. When the split lens assembly module 3010 is assembled, the focusing mechanism 3012 is inversely disposed on the second bearing portion 3022, and the bearing structure 3013 is inversely disposed on the first bearing portion 3021. In the assembly process, the first bearing portion 3021 is used for holding the bearing structure 3013 and the lens barrel member 3014, and the second bearing portion 3022 is used for holding the focusing mechanism 3012.

Further, the air channels 3023 penetrate through the top and the bottom of the jig 3020 such that the external environment of the top of the jig 3020 and the external environment of the bottom of the jig are connected through the air channels 3023. At least one of the air channels 3023 is disposed on the first bearing portion 3021, at least one of the air channels 3023 is disposed on the second bearing portion 3022, to facilitate placing a suction nozzle or other vacuum device on the bottom of the jig 3020 to apply an external force to the bearing structure 3013 and the focusing mechanism 3012 through the air channels 3023, to fix the bearing structure 3013 or/and the lens barrel member 3014, and the focusing mechanism 3012 to the first bearing portion 3021 and the second bearing portion 3022 respectively, to facilitate the assembly in a subsequent process.

In the present preferred embodiment, four air channels 3023 are evenly disposed at each of the first bearing portion 3021 and the second bearing portion 3022 at intervals so as to fix the bearing structure 3013 and the focusing mechanism 3012 from all directions, achieving a firmer fixation.

Figure 21:
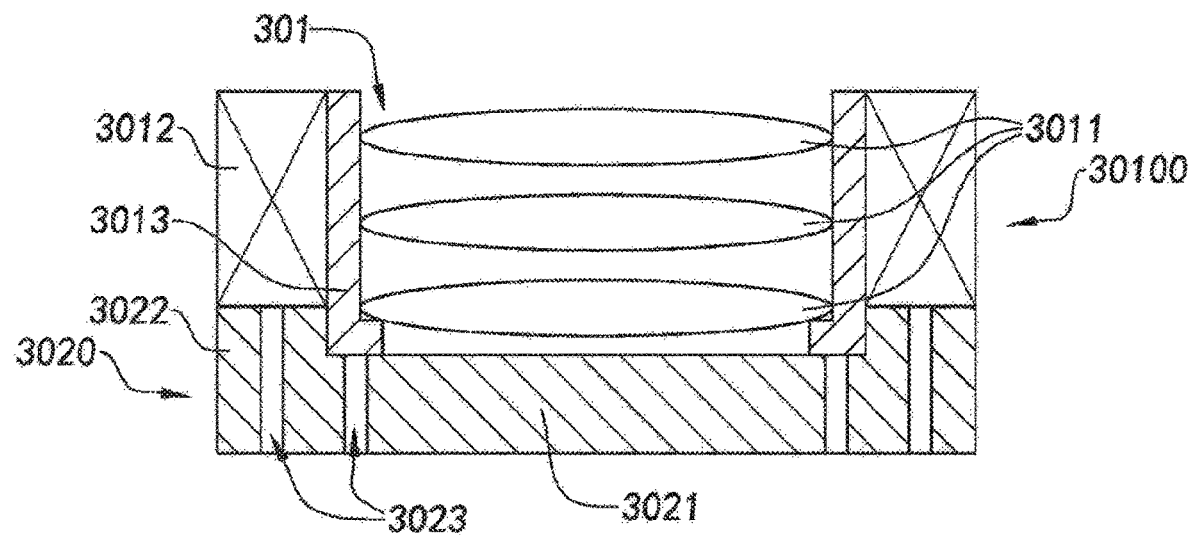
FIGS. 21-22 are schematic diagrams of a first method for assembling the split lens assembly module according to the above preferred embodiment of the present disclosure.
Figure 22:
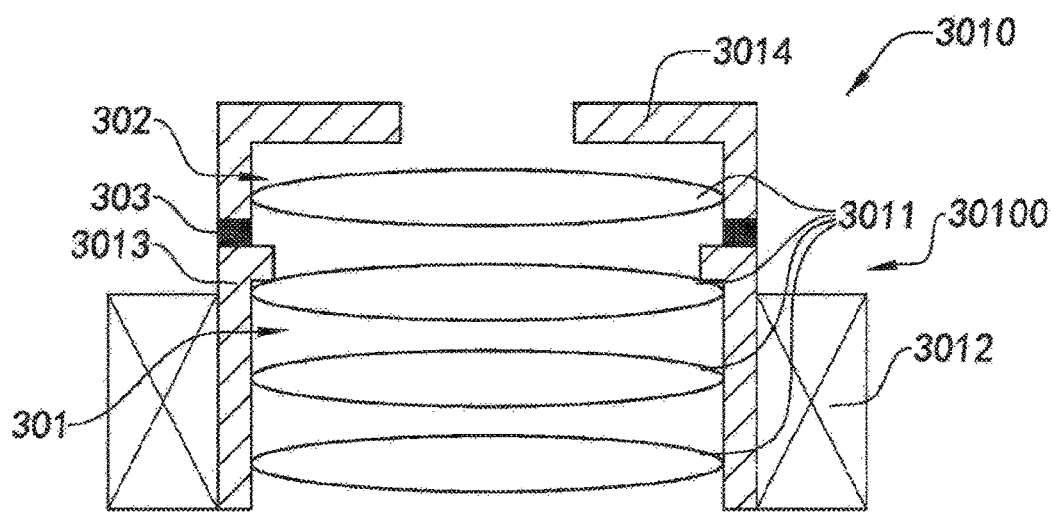
Figure 27:
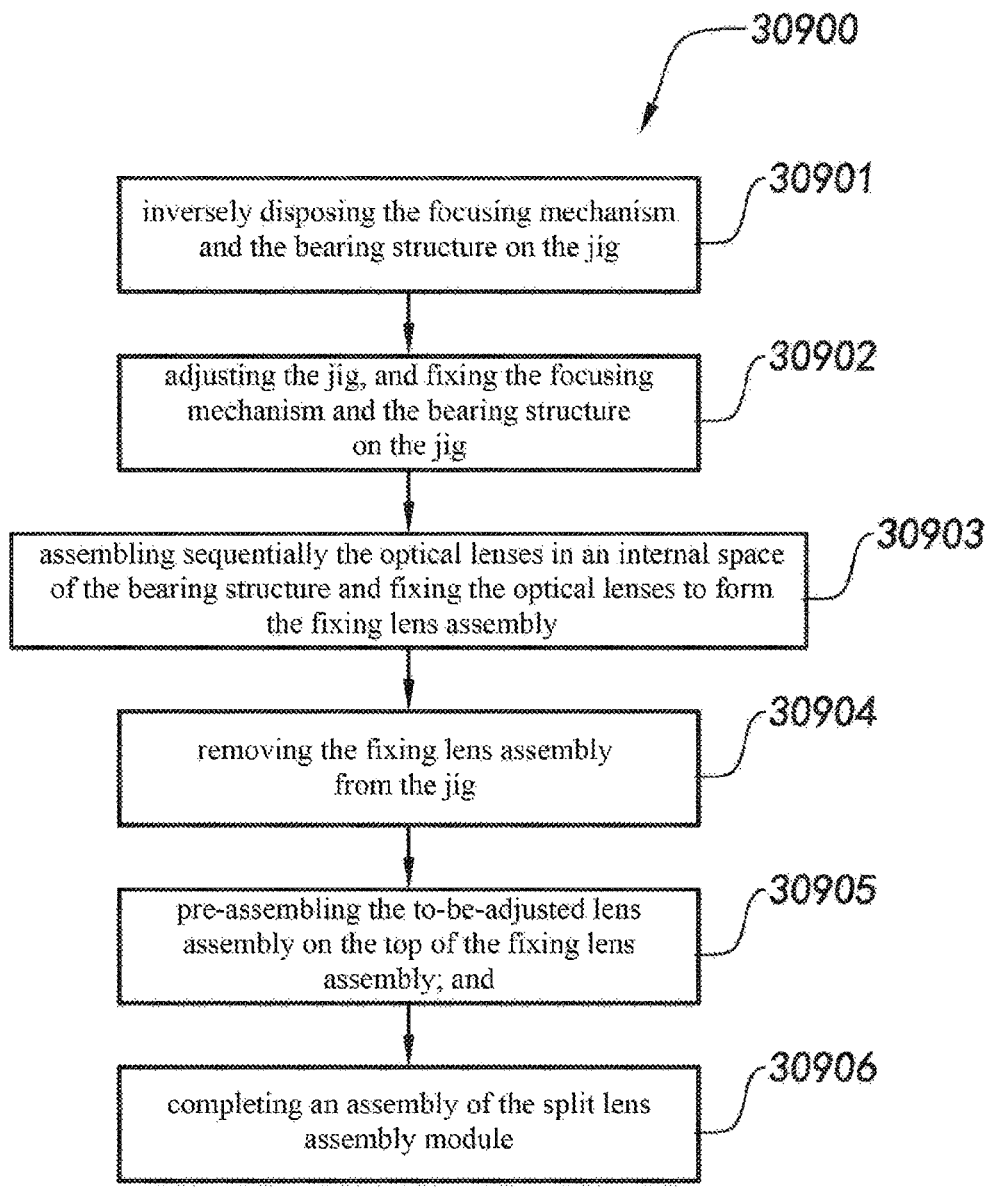
FIG. 27 is a flowchart of a method for assembling the split lens assembly module according to the above preferred embodiment of the present disclosure.

As shown in FIG. 21, FIG. 22 and FIG. 27, an assembly method 900 of the split lens assembly module 3010 includes the following steps:

step (30901): inversely disposing the focusing mechanism 3012 and the bearing structure 3013 on the jig 3020;

step (30902): adjusting the jig 3020, and fixing the focusing mechanism 3012 and the bearing structure 3013 on the jig 3020;

step (30903): assembling sequentially the optical lenses 3011 in an internal space of the bearing structure 3013 and fixing the optical lenses 3011 to form the fixing lens assembly 301;

step (30904): removing the fixing lens assembly 301 from the jig 3020;

step (30905): pre-assembling the to-be-adjusted lens assembly 302 on the top of the fixing lens assembly 301; and step (30906): completing an assembly of the split lens assembly module 3010.

In the step (30901), since the bearing structure 3013 has been designed to have dual functions of the lens barrel and the holder of the focusing mechanism when it is designed, the focusing mechanism 3012 and the bearing structure 3013 may be assembled in one of the following three methods: (a) the focusing mechanism 3012 may be connected to the bearing structure 3013 in advance so that the bearing structure 3013 has the function of the holder of the focusing mechanism 3012, and the two as a whole are inversely disposed on the jig 3020 so that the bearing structure has the function of the lens barrel; (b) the focusing mechanism 3012 and the bearing structure 3013 are inversely disposed on the matched jig 3020 respectively, then the focusing mechanism 3012 and the bearing structure 3013 are assembled; (c) after assembling the optical lenses 3011 inside the bearing structure 3013 such that the bearing structure 3013 has the function of the lens barrel and the bearing structure 3013 is assembled with the optical lenses 3011 as a whole, the bearing structure 3013 and the focusing mechanism 3012 are assembled such that bearing structure has the function of the holder of the focusing mechanism 3012.

In the step (30902), by adjusting the jig 3020 to be matched with a suction nozzle or a vacuum device, the suction nozzle or the vacuum device applies a pressure on the air channels 3023 at the bottom of the jig 3020, so that adsorption can be performed through the air channels 3023 to fix the focusing mechanism 3012 and the bearing structure 3013, and the focusing mechanism 3012 and the bearing structure 3013 are respectively fixed to the second bearing portion 3022 and the first bearing portion 3021 of the jig 3020 to avoid sliding, shaking, and offsetting of the second bearing portion 3022 and the first bearing portion 3021 in a subsequent assembly process, thereby reducing the assembly deviation and ensuring the assembly precision.

Further, a depth of the groove formed between the first bearing portion 3021 and the second bearing portion 3022 is equal to a height difference between the bearing structure 3013 and the focusing mechanism 3012, such that a portion of the bearing structure 3013 higher than the focusing mechanism 3012 can be accommodated.

It is worth mentioning that if the bearing structure 3013 and the focusing mechanism 3012 are connected before being inverted, the first bearing portion 3021 does not need to be provided with the air channels 3023, and only the focusing mechanism 3012 needs to be fixed.

In the step (30903), the optical lenses 3011, such as the three optical lenses 3011 in the present preferred embodiment, are placed. In the present preferred embodiment, the three optical lenses 3011 are sequentially placed one by one, and it is suitable for fixing the three optical lenses 3011 directly by the thermosetting adhesive after the placement. The optical lens may be fixed each time one optical lens is placed, or the optical lenses may be fixed after all optical lenses are placed, depending on the actual situation. Those skilled in the art may understand that the assembly method of the optical lenses 3011 may be selected according to the structure of the inner wall of the bearing structure 3013. For example, three optical lenses 3011 may alternatively be pre-fitted and assembled together and then mounted as a whole to the internal space of the bearing structure 3013.

It is worth mentioning that the optical lenses 3011 may alternatively be pre-assembled in the lens barrel member 3014 and adjusted in a subsequent process.

In the step (30904), first, the suction nozzle or other vacuum device is removed, then the fixing lens assembly 301 is taken out from the jig 3020 to complete the assembly of the fixing lens assembly 301. Here, the fixing lens assembly 301 may be taken out by injecting air through the air channels 3023. By exerting an opposite force on the fixing lens assembly 301, the fixing lens assembly 301 is pushed out, and then taken out. Other methods may alternatively be adopted to take out the fixing lens assembly 301 according to the actual situation.

In the step (30905), before the to-be-adjusted lens assembly 302 is pre-assembled in the fixing lens assembly 301, the to-be-adjusted lens assembly 302 is assembled, and one optical lens 3011 is fixed in the internal space of the lens barrel member 3014 to complete the assembly of the to-be-adjusted lens assembly 302. The jig 3020 may be used to assist the assembly of the to-be-adjusted lens assembly 302. The lens barrel member 3014 of the to-be-adjusted lens assembly 302 is fixed to the first bearing portion 3021 through the air channels 3023, and the optical lenses 3011 are further mounted on the lens barrel member 3014 and fixed.

After the to-be-adjusted lens assembly 302 is assembled, the to-be-adjusted lens assembly 302 is mounted on the top of the fixing lens assembly 301 using the glue 303, that is, the glue 303 is applied to the bottom of the to-be-adjusted lens assembly 302 or applied to the top of the fixing lens assembly 301, that is, the glue 303 is applied to the bottom of the lens barrel member 3014 or the top of the bearing structure 3013, so that the lens barrel member 3014 and the bearing structure 3013 are connected through the glue 303, and the lens barrel member 3014 is adjusted to adjust the to-be-adjusted lens assembly 302.

In the step (30906), the to-be-adjusted lens assembly 302 is pre-assembled in the split lens assembly module 3010, and its assembly position may be adjusted. When the split lens assembly module 3010 is assembled to the camera module, the to-be-adjusted lens assembly 302 is adjusted so that the imaging of the camera module satisfies the resolution requirement. Then, the to-be-adjusted lens assembly 302 is completely fixed.

Figure 23:
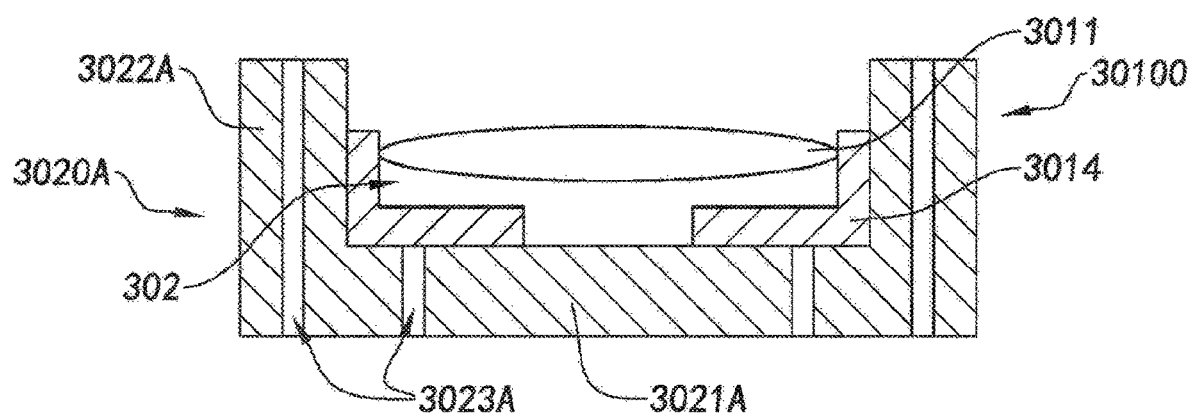
FIGS. 23-24 are schematic diagrams of a second method for assembling the split lens assembly module according to the above preferred embodiment of the present disclosure.
Figure 24:
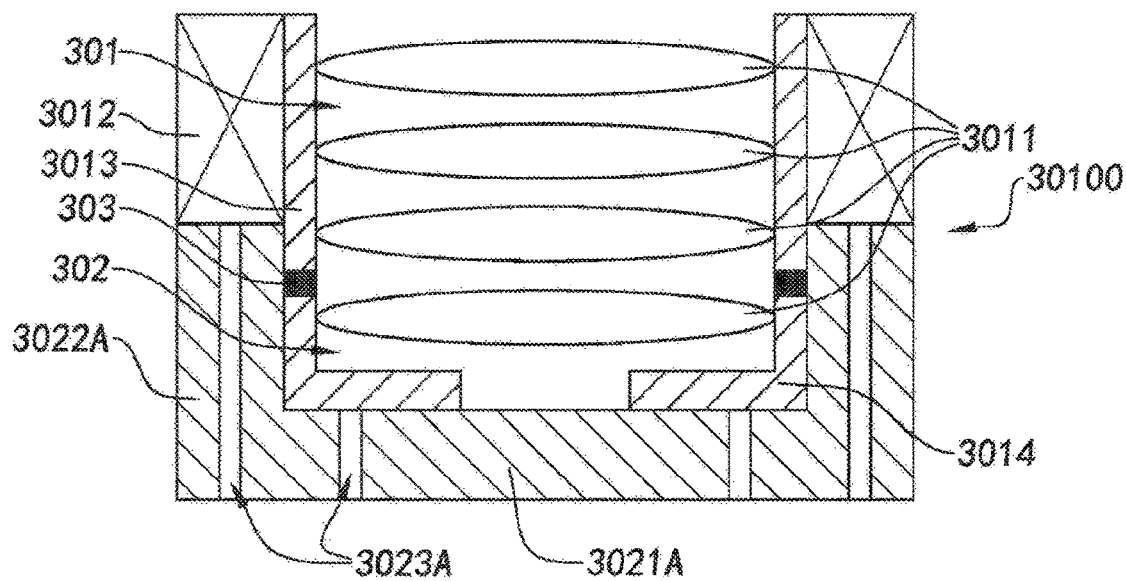
Figure 28:
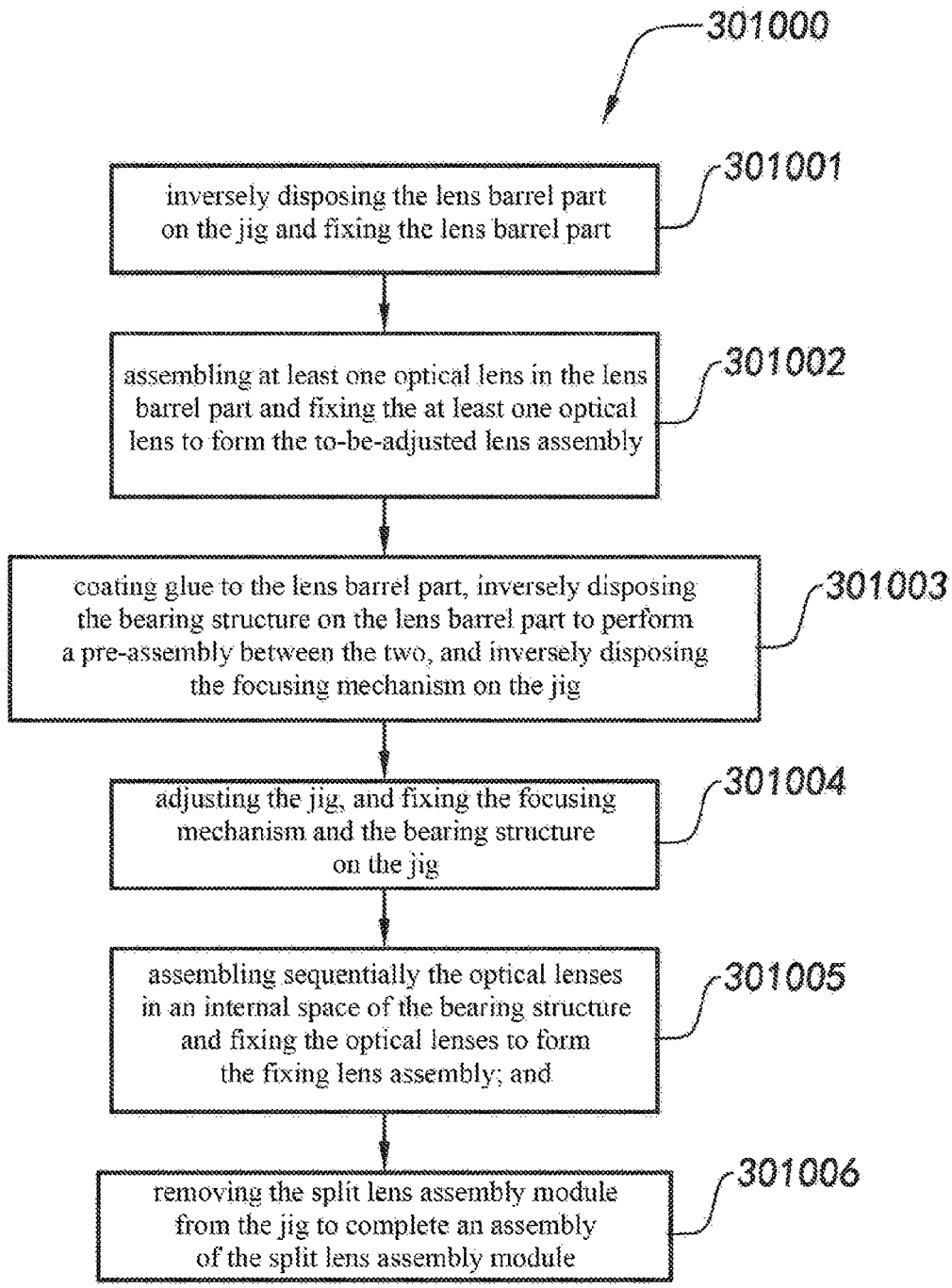
FIG. 28 is a flowchart of another method for assembling the split lens assembly module according to the above preferred embodiment of the present disclosure.

Referring to FIG. 23, FIG. 24 and FIG. 28, a second assembling method of the split lens assembly module 3010 provided by the present disclosure will be described. A jig 3020A matches the split lens assembly module 3010 to assist the assembly of the split lens assembly module 3010. The jig 3020A includes a first bearing portion 3021A and a second bearing portion 3022A, and has at least two air channels 3023A. The second bearing portion 3022A is disposed at the periphery of the first bearing portion 3021A, at least one air channel 3023A is disposed at the first bearing portion 3021A, and at least one air channel 3023A is disposed at the second bearing portion 3022A.

Further, the shape and size of the first bearing portion 3021A are matched with the shape and size of the lens barrel member 3014 and the bearing structure 3013 which are stacked together. The second bearing portion 3022A and the focusing mechanism 3012 are matched in shape and size to facilitate the assembly thereof. The top end surface of the first bearing portion 3021A is lower than the bottom end surface of the second bearing portion 3022A, and a groove is formed between the two. In addition, the top end surface of the bearing structure 3013 is higher than the top end surface of the focusing mechanism 3012. The lens barrel member 3014 is disposed on the top of the bearing structure 3013. Therefore, in the present preferred embodiment, a depth of the groove is equal to a sum of a height difference between the bearing structure 3013 and the focusing mechanism 3012, and a height of the lens barrel member 3014, so as to accommodate the lens barrel member 3014 and a portion of the bearing structure 3013 higher than the focusing mechanism 3012, which facilitates fixing for the assembly.

A second assembly method 301000 of the split lens assembly module 3010 includes the following steps:

step (301001): inversely disposing the lens barrel member 3014 on the jig 3020A and fixing the lens barrel member 3014;

step (301002): assembling one optical lens 3011 in the lens barrel member 3014 and fixing the optical lens in the lens barrel member to form the to-be-adjusted lens assembly 302;

step (301003): applying glue to the lens barrel member 3014, inversely disposing the bearing structure 3013 on the lens barrel member 3014 to perform a pre-assembly between the two, and inversely disposing the focusing mechanism 3012 on the jig 3020A;

step (301004): adjusting the jig 3020A, fixing the focusing mechanism 3012 and the bearing structure 3013 on the jig 3020A;

step (301005): assembling sequentially the optical lenses 3011 in an internal space of the bearing structure 3013 and fixing the optical lenses 3011 in the internal space of the bearing structure to form the fixing lens assembly 301; and step (301006): removing the split lens assembly module 3010 from the jig 3020A to complete an assembly of the split lens assembly module 3010.

In the step (301001), the lens barrel member 3014 is inversely disposed on the first bearing portion 3021A of the jig 3020A so that the lens barrel member 3014 is located in the groove of the jig 3020A. A suction nozzle or other vacuum device is placed on the bottom of the jig 3020A, and the lens barrel member 3014 is fixed by the air channels 3023A disposed in the first bearing portion 3021A to avoid offset and tilting in the process of assembling the lens, to ensure the assembly precision.

In the step (301002), one optical lens 3011 is mounted in the internal space of the lens barrel member 3014 and fixed by glue or welding. In the embodiment, the optical lens 3011 is fixed by thermosetting adhesive.

In addition, those skilled in the art may alternatively fix multiple optical lenses 3011 in the lens barrel member 3014. The number of lenses and the number of lens barrel members are only examples, and do not limit the present disclosure.

In the step (301003), the bottom of the lens barrel member 3014 is coated with glue, and alternatively the top of the bearing structure 3013 may be coated with glue, and then the lens barrel member 3014 and the bearing structure 3013 are stacked to achieve the assembly of the two. For example, the glue 303 applied may be the thermosetting adhesive or a mixed glue of the thermosetting adhesive and the UV adhesive. Then, the bearing structure 3013 is inversely disposed on the bottom of the lens barrel member 3014. The lens barrel member 3014 and the bearing structure 3013 are pre-assembled through the glue 303. The assembly position of the lens barrel member 3014 is suitable for being adjusted, and the portion of the bearing structure 3013 higher than the focusing mechanism 3012 is located in the groove of the jig 3020A. in addition, the focusing mechanism 3012 is placed on the second bearing portion 3022A.

It is worth mentioning that in the step (301003), since the bearing structure 3013 has been designed to have dual functions of the lens barrel and the holder of the focusing mechanism when it is designed, the focusing mechanism 3012 and the bearing structure 3013 may be assembled in one of the following three methods: (a) the focusing mechanism 3012 may be connected to the bearing structure 3013 in advance so that the bearing structure 3013 has the function of the holder of the focusing mechanism 3012, and the two as a whole are inversely disposed on the jig 3020 such that the bearing structure has the function of the lens barrel; (b) the focusing mechanism 3012 and the bearing structure 3013 are inversely disposed on the matched jig 3020 respectively, then the focusing mechanism 3012 and the bearing structure 3013 are assembled; (c) after assembling the optical lenses 3011 inside the bearing structure 3013, the bearing structure 3013 has the function of the lens barrel, and the bearing structure 3013 is assembled with the optical lenses 3011 as a whole, the bearing structure 3013 and the focusing mechanism 3012 are assembled to further have the function of the holder of the focusing mechanism 3012.

In the step (301004), by adjusting the jig 3020A to be matched with a suction nozzle or a vacuum device, the suction nozzle or the vacuum device applies an pressure on the air channels 3023A at the bottom of the jig 3020A, so that adsorption can be performed through the air channels 3023A to fix the focusing mechanism 3012, the focusing mechanism 3012 is further fixed to the second bearing portion 3022A of the jig 3020A, and the bearing structure 3013 is firmly located in the groove by glue between the bearing structure 3013 and the lens barrel member 3014, to avoid sliding, shaking, and offsetting in a subsequent assembly process, thereby reducing the assembly deviation and ensuring the assembly precision.

In the step (301005), the optical lenses 3011, such as the three optical lenses 3011 in the present preferred embodiment, are placed. In the present preferred embodiment, the three the optical lenses 3011 are sequentially placed one by one, and are suitable for being fixed directly by the thermosetting adhesive after the placement. The optical lens may be fixed each time one optical lens is placed, or the optical lenses may be fixed after all optical lenses are placed, depending on the actual situation. Those skilled in the art may understand that the assembly method of the optical lenses 3011 may be selected according to the structure of the inner wall of the bearing structure 3013. For example, three optical lenses 3011 may alternatively be pre-fitted and assembled together and then mounted as a whole to the internal space of the bearing structure 3013.

In the step (301006), first, the suction nozzle or other vacuum device is removed, then the split lens assembly module 3010 is taken out from the jig 3020A to complete the assembly of the split lens assembly module 3010. Here, the split lens assembly module 3010 may be taken out by injecting air through the air channels 3023A. By exerting an opposite force on the split lens assembly module 3010, the split lens assembly module 3010 is pushed out, and then taken out. Other methods may also be adopted to take out the split lens assembly module 3010 according to the actual situation.

The to-be-adjusted lens assembly 302 is pre-assembled in the split lens assembly module 3010, and its assembly position may be adjusted. When the split lens assembly module 3010 is assembled to the camera module, the to-be-adjusted lens assembly 302 is adjusted so that the imaging of the camera module satisfies the resolution requirement. Then, the to-be-adjusted lens assembly 302 is completely fixed.

In addition, in the present preferred embodiment, the lens barrel member 3014 and the bearing structure 3013 may alternatively be pre-assembled, and then the optical lenses 3011 may be sequentially mounted on the lens barrel member 3014 and the bearing structure 3013 respectively. After fixing, the pre-assembly of the split lens assembly module 3010 is completed, that is, instead of assembled in the above step (301002), the optical lens is assembled in the step (301005) when the three optical lenses 3011 are assembled.

Figure 25:
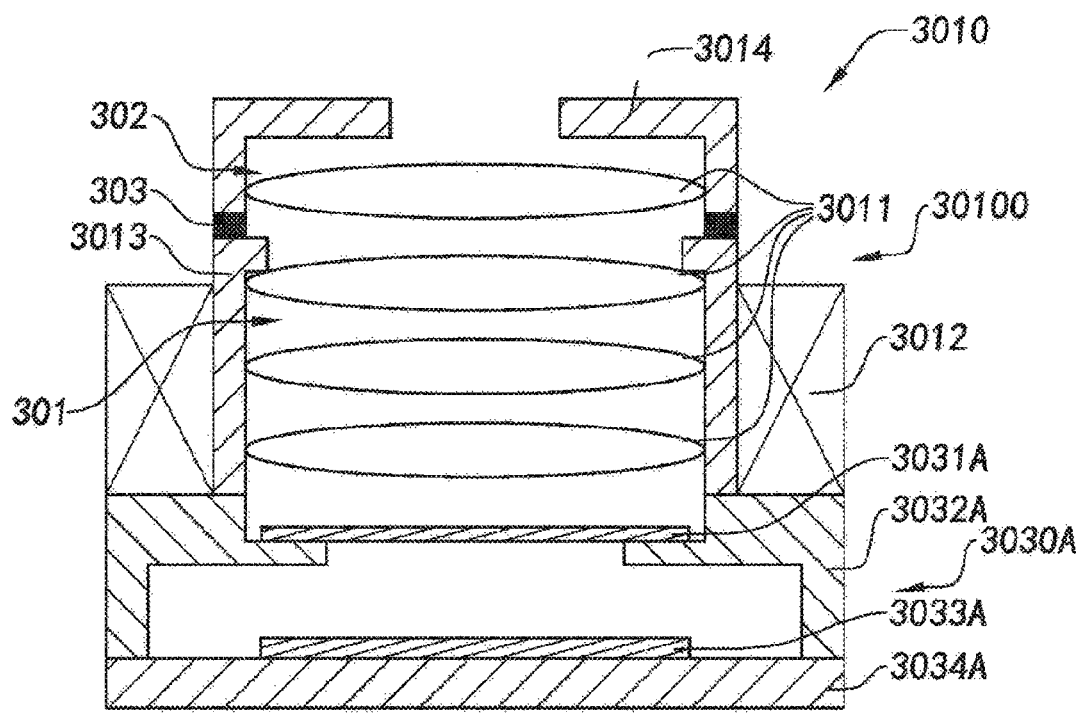
FIG. 25 is a schematic cross-sectional diagram of a camera module including the split lens assembly module according to the above preferred embodiment of the present disclosure.

Referring to FIG. 25, a camera module including the split lens assembly module 3010 in the above preferred embodiment will be described. As shown in FIG. 25, a camera module includes the split lens assembly module 3010 and a photosensitive device 3030A. The photosensitive device 3030A includes an optical filter 3031A, a lens holder 3032A, a photosensitive chip 3033A, and a circuit board 3034A. The photosensitive device 3030A is manufactured by a COB (chip on board) process. The optical filter 3031A is mounted inside the upper portion of lens holder 3032A and is connected to the lens holder 3032A and located above the photosensitive chip 3033A. The photosensitive chip 3033A is mounted on the circuit board 3034A, and separates from the inner wall of the lens holder 3032A. The circuit board 3034A is mounted on the bottom of the lens holder 3032A and allows the photosensitive chip 3033A to be mounted in the cavity inside the lens holder 3032A. The split lens assembly module 3010 is mounted on the top of the photosensitive device 3030A and located on the photosensitive path of the photosensitive chip 3033A. Lights reflected by an object pass through the split lens assembly module 3010 and enter into the camera module, and are received by the photosensitive chip 3033A for photoelectric conversion, so that an object-related image can be obtained in the camera module subsequently.

Further, the focusing mechanism 3012 and the bearing structure 3013 are both fixedly assembled on the top of the lens holder 3032A and are connected with the lens holder 3032A, so that each of the optical lenses 3011 is located on the photosensitive path of the photosensitive chip 3033, which facilitates subsequent imaging, and enables the camera module to operate more stably and reliably.

It is worth mentioning that, after the split lens assembly module 3010 and the photosensitive device 3030A are assembled, the pre-assembly of the camera module is completed, the pre-assembled camera module is powered on, and the imaging of the camera module is collected. An adjustment method and an adjustment amount of the to-be-adjusted lens assembly 302 are calculated using the software according to an optical method based on the imaging of the camera module, and an assembly position of the to-be-adjusted lens assembly 302 is adjusted based on the adjustment amount, so that the center axis of the split lens assembly module 3010 coincides with the center axis of the photosensitive chip 3033A or is within an allowable range of deviation, so that the imaging of the camera module satisfies the resolution requirement. Then, the to-be-adjusted lens assembly 302 is completely fixed so that the lens barrel member 3014 and the bearing structure 3013 are fixed together, that is, the to-be-adjusted lens assembly 302 and the fixing lens assembly 301 are fixed together, and the assembly of the camera module is completed.

Preferably, the glue 303 pre-assembling the to-be-adjusted lens assembly 302 and the fixing lens assembly 301 achieves the pre-assembly in a semi-cured state, which may semi-fix the to-be-adjusted lens assembly 302 to avoid the offset of the to-be-adjusted lens assembly 302, and are adjustable. After the adjustment is completed, the fixation of the to-be-adjusted lens assembly 302 is achieved by completely curing the glue 303, and the assembly of the camera module is completed.

Here, the assembly position of the to-be-adjusted lens assembly 302 is suitable for being adjusted relative to the directions of the six axes X, Y, Z, U, V and W of the camera module.

Figure 26:
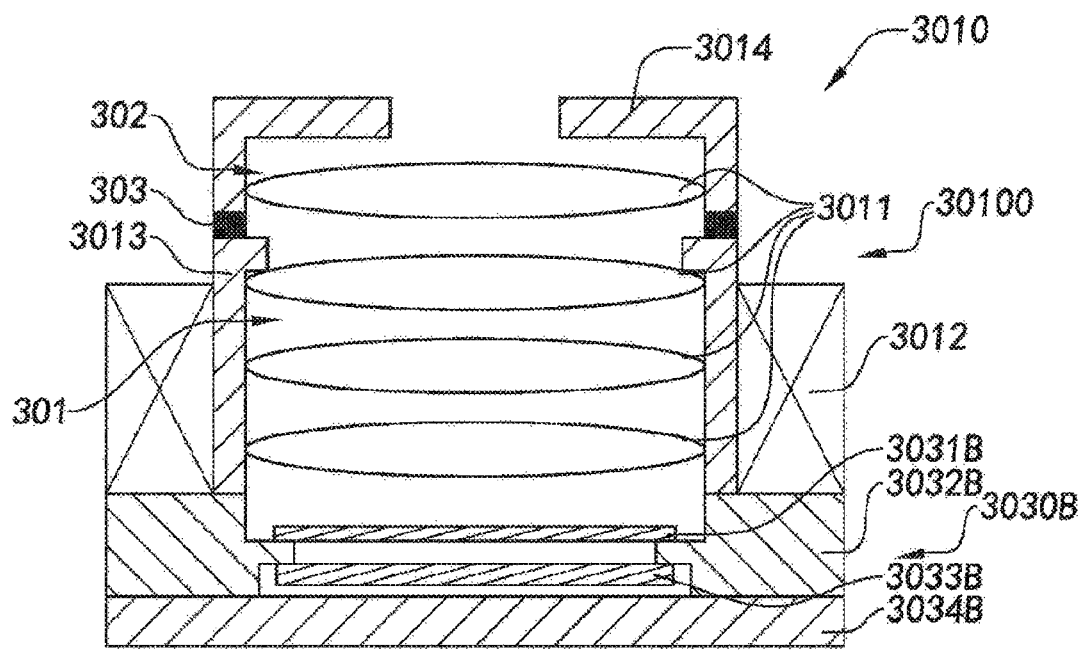
FIG. 26 is a modified embodiment of the camera module including the split lens assembly module according to the above preferred embodiment of the present disclosure.

Referring to FIG. 26, an embodiment of a camera module including the split lens assembly module 3010 in the above preferred embodiment will be described. As shown in FIG. 26, a camera module includes the split lens assembly module 3010 and a photosensitive device 3030B. The photosensitive device 3030B includes an optical filter 3031B, a lens holder 3032B, a photosensitive chip 3033B, and a circuit board 3034B. The photosensitive device 3030B is manufactured by a COB (chip on board) process. The optical filter 3031B is mounted inside the upper portion of the lens holder 3032B and is connected to the lens holder 3032B. The photosensitive chip 3033B is mounted below the optical filter 3031B and separates from the optical filter 3031B. The photosensitive chip 3033B is directly connected to the lens holder 3032B, and separates from the circuit board 3034B mounted at the bottom of the lens holder 3032B. The lens holder 3032B has an electrical function, and a corresponding electrical element is implanted insides the lens holder 3032B, which ensures the imaging of the camera module, and a thinner and more compact photosensitive device 3030B. As a result, the size of the camera module is smaller.

The split lens assembly module 3010 is mounted on the top of the photosensitive device 3030B and located on the photosensitive path of the photosensitive chip 3033B. Lights reflected by an object pass through the split lens assembly module 3010 and enter into the camera module, and are received by the photosensitive chip 3033B for photoelectric conversion, so that an object-related image can be obtained in the camera module subsequently.

Further, the focusing mechanism 3012 and the bearing structure 3013 are both fixedly assembled on the top of the lens holder 3032B and are connected with the lens holder 3032B, so that each of the optical lenses 3011 is located on the photosensitive path of the photosensitive chip 3033B, which facilitates subsequent imaging, and enables the camera module to operate more stably and reliably.

It should be understood by those skilled in the art that the embodiments of the present disclosure shown in the above description and the accompanying drawings are only examples and do not limit the present disclosure. The objective of the present disclosure has been achieved fully and effectively. The functional and structural principles of the present disclosure have been shown and described in the embodiments. Without departing from the principles described above, the embodiments of the present disclosure may have any variations or modifications.

What is claimed is:

1. A camera module, comprising:
   a photosensitive device, the photosensitive device comprising a photosensitive chip; and
   a split lens assembly module, wherein the split lens assembly module is disposed on a photosensitive path of the photosensitive chip, the split lens assembly module comprises a focusing mechanism and a lens assembly, the lens assembly comprises at least two optical lenses, at least one lens barrel member and a bearing structure, each of the at least one lens barrel member holds at least one optical lens to form a to-be-adjusted lens assembly, the bearing structure holds directly at least one optical lens to form a fixing lens assembly, the to-be-adjusted lens assembly is pre-assembled on the fixing lens assembly, the to-be-adjusted lens assembly is suitable for being adjusted relative to an assembly position of the photosensitive chip, the fixing lens assembly is mounted inside the focusing mechanism, and moves as the focusing mechanism is powered on, which is suitable for focusing wherein, the focusing mechanism is coupled directly to the bearing structure.

2. The camera module according to claim 1, wherein the lens barrel member is pre-assembled on a top of the bearing structure by glue to realize a pre-assembly of the to-be-adjusted lens assembly and the fixing lens assembly.

3. The camera module according to claim 2, wherein the glue used in the pre-assembly is a mixed adhesive of a UV adhesive and a thermosetting adhesive, the glue is semi-cured by ultraviolet exposure to realize the pre-assembly, and the glue is completely cured by a baking treatment to fix the entire split lens assembly module.

4. The camera module according to claim 1, wherein an assembly position of the to-be-adjusted lens assembly is suitable for being adjusted in at least one direction, so that after an adjustment a center axis of the split lens assembly module coincides with a center axis of the photosensitive chip or is within an allowable range of deviation.

5. The camera module according to claim 2, wherein an assembly position of the to-be-adjusted lens assembly is suitable for being adjusted in at least one direction, so that after an adjustment a center axis of the split lens assembly module coincides with a center axis of the photosensitive chip or is within an allowable range of deviation.

6. The camera module according to claim 1, wherein the bearing structure is mounted inside the focusing mechanism and moves along the focusing mechanism.

7. The camera module according to claim 6, wherein a top end surface of the bearing structure is higher than a top end surface of the focusing mechanism.

8. The camera module according to claim 6, wherein the focusing mechanism is suitable for being selected from a voice coil motor, a piezoelectric ceramic motor or a liquid crystal motor.

9. The camera module according to claim 6, wherein the photosensitive device further comprises an optical filter, a lens holder, and a circuit board, the optical filter is connected to an inner wall of the lens holder and located above the photosensitive chip, the photosensitive chip is mounted on the circuit board, and the circuit board is mounted on a bottom of the lens holder, so that the photosensitive chip is located inside the lens holder and separates from the inner wall of the lens holder.

10. The camera module according to claim 6, wherein the photosensitive device further comprises an optical filter, a lens holder, and a circuit board, the optical filter and the photosensitive chip are both mounted inside the lens holder and connected to an inner wall of the lens holder, the optical filter is disposed above the photosensitive chip, and the circuit board is mounted on a bottom of the lens holder.

11. A method for assembling a split lens assembly module, comprising:
   step (A): assembling at least one optical lens in an internal space of a lens barrel member to form a to-be-adjusted lens assembly;
   step (B): assembling at least one optical lens in an internal space of a bearing structure to form a fixing lens assembly, wherein the bearing structure is disposed inside a focusing mechanism and moves as the focusing mechanism is powered on, wherein the bearing structure holds directly the at least one optical lens, and the focusing mechanism is coupled directly to the bearing structure; and step (C): pre-assembling the to-be-adjusted lens assembly and the fixing lens assembly to form the split lens assembly module with the adjustable to-be-adjusted lens assembly.

12. The method according to claim 11, wherein in the step (A), the lens barrel member is inversely fixed in a groove of a jig, and the optical lenses are mounted to the internal space of the lens barrel member along a height direction of the lens barrel member and fixed.

13. The method according to claim 11, wherein in the step (B), the bearing structure and the focusing mechanism are respectively inversely fixed to a first bearing portion and a second bearing portion of a jig, and the optical lenses are mounted to the internal space of the bearing structure along a height direction of the bearing structure and fixed.

14. The method according to claim 12, wherein in the step (B), the bearing structure and the focusing mechanism are respectively inversely placed on a bottom of the lens barrel member and a second bearing portion of the jig, and the optical lenses are mounted to the internal space of the bearing structure along a height direction of the bearing structure and fixed.

15. The method according to claim 13, wherein in the step (C), the fixing lens assembly is removed from the jig, the assembled to-be-adjusted lens assembly is pre-assembled on a top of the fixing lens assembly, an assembly position of the to-be-adjusted lens assembly is suitable for being adjusted in at least one direction relative to a spatial position of the fixing lens assembly.

16. The method according to claim 14, wherein in the step (C), before pre-assembling the to-be-adjusted lens assembly and the fixing lens assembly, the bottom of the lens barrel member is coated with glue or a top of the bearing structure is coated with the glue, a pre-assembly between the bearing structure and the lens barrel member is realized by the glue, and an assembly position of the to-be-adjusted lens assembly is suitable for being adjusted in at least one direction.

17. The method according to claim 15, wherein in the step (C), a pre-assembly of the to-be-adjusted lens assembly and the fixing lens assembly is realized by glue, by coating the top of the fixing lens assembly or a bottom of the to-be-adjusted lens assembly with the glue.

18. The method according to claim 16, wherein in the method, the lens barrel member and the bearing structure are held by a first bearing portion of the jig, the focusing mechanism is held by the second bearing portion, the groove formed by the first bearing portion and the second bearing portion is adapted to accommodate the lens barrel member and a portion of the bearing structure higher than the focusing mechanism, and a depth of the groove is equal to a sum of a height of the lens barrel member and a height of the portion of the bearing structure higher than the focusing mechanism.

19. The method according to claim 17, wherein a shape and a size of the first bearing portion matches a shape and size of the bearing structure, and a shape and a size of the second bearing portion matches the lens barrel member, the groove formed by the first bearing portion and the second bearing portion is adapted to accommodate a portion of the bearing structure higher than the focusing mechanism, and a depth of the groove is equal to a height difference between the bearing structure and the focusing mechanism.

20. The method according to claim 18, wherein the bearing structure and the focusing mechanism are fixed by at least two air channels of the jig, the air channels each penetrating a top and a bottom of the jig, and the air channels are respectively disposed at the first bearing portion and the second bearing portion, which is suitable for fixing the bearing structure and the focusing mechanism through the air channels using a suction nozzle or a vacuum device.

21. The method according to claim 20, wherein in the glue used in the pre-assembly is a mixed adhesive of a thermo-setting adhesive and a UV adhesive, the glue is semi-cured by ultraviolet exposure to realize the pre-assembly, and the glue is completely cured by a baking treatment to fix the entire split lens assembly module.

22. The method according to claim 18, wherein directions of six axes of X, Y, Z, U, V and W of the assembly position of the to-be-adjusted lens assembly are all suitable for being adjusted.

23. The method according to claim 18, wherein in the step (B), the bearing structure is mounted inside the focusing mechanism and used as a holder of the focusing mechanism, and moves along the focusing mechanism as the focusing mechanism is powered on.

24. The method according to claim 21, wherein in the step (B), the bearing structure is mounted inside the focusing mechanism and used as a holder of the focusing mechanism, and moves along the focusing mechanism as the focusing mechanism is powered on.

25. The method according to claim 23, wherein in the step (B), the focusing mechanism is connected with the bearing structure in advance as a whole or the bearing structure is pre-assembled inside the focusing mechanism, such that the focusing mechanism is connected to the bearing structure in the step (C).

* * * * *